US006924735B2

(12) United States Patent
Ueda et al.

(10) Patent No.: US 6,924,735 B2
(45) Date of Patent: Aug. 2, 2005

(54) AUTOMATIC VEHICLE DOOR LOCKING/UNLOCKING APPARATUS

(75) Inventors: Shinichi Ueda, Tochigi-ken (JP); Shinichi Arie, Saitama (JP); Kentaro Yoshimura, Tochigi-ken (JP); Suguru Asakura, Utsunomiya (JP); Akira Kamikura, Utsunomiya (JP); Kenichi Sawada, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 110 days.

(21) Appl. No.: 10/680,211

(22) Filed: Oct. 8, 2003

(65) Prior Publication Data

US 2004/0075532 A1 Apr. 22, 2004

(30) Foreign Application Priority Data

Oct. 9, 2002 (JP) ....................................... 2002-296811

(51) Int. Cl.[7] ................................................ B60R 25/10

(52) U.S. Cl. ............................ 340/426.28; 340/825.69; 340/5.61; 340/426.36; 340/426.28; 307/9.1; 307/10.1

(58) Field of Search ........................ 340/426.28, 426.36, 340/430, 426.24, 3.1, 5.2, 10.1, 10.2, 825.31, 825.69, 5.6, 5.61, 425.5, 426.1; 307/9.1, 10.1, 10.2, 10.5

(56) References Cited

U.S. PATENT DOCUMENTS 4,811,013 A * 3/1989 Akutsu ...................... 340/5.54
4,973,958 A * 11/1990 Hirano et al. .......... 340/825.69
5,835,022 A * 11/1998 Amano ...................... 340/5.64
6,476,517 B1 * 11/2002 Okada ....................... 307/10.2
6,542,071 B1 * 4/2003 Ohtsubo et al. ....... 340/426.28
6,801,134 B1 * 10/2004 Juzswik ................ 340/825.69
6,853,296 B2 * 2/2005 Chandebois ........... 340/426.28

FOREIGN PATENT DOCUMENTS

JP 3-55633 8/1991
JP 2001145017 A 5/2001

* cited by examiner

*Primary Examiner*—Jeffery Hofsass
*Assistant Examiner*—Eric Blount
(74) *Attorney, Agent, or Firm*—Arent Fox, PLLC

(57) ABSTRACT

An apparatus automatically locks the doors of a vehicle based on mutual communications between a portable unit and a vehicle-side control unit. After the doors are closed and locked after all the passengers get off the vehicle, the user of a portable unit unlocks the doors in order to allow a person without the portable unit to fetch something left in the vehicle. After the person opens a door, takes whatever he or she needs, and closes the door, the doors are automatically locked. When a door sensor is operated to unlock the doors, and one of the doors is opened, a memory means stores information indicating that the portable unit is present in a predetermined range outside of the vehicle. If the memory means stores information that the doors are unlocked, then the doors are automatically locked.

2 Claims, 15 Drawing Sheets

AUTOMATIC VEHICLE DOOR LOCKING/ UNLOCKING APPARATUS

BACKGROUND OF THE INVENTION

1. Field of the Invention

The present invention relates to an apparatus for automatically locking and unlocking doors of a vehicle based on mutual communication between a portable unit carried by a driver of the vehicle (a portable unit user) and a controller built-in the vehicle. More particularly, the present invention relates to an automatic vehicle door locking/unlocking apparatus for automatically locking the doors of the vehicle even when the portable unit user is not in an effective communication range of the portable unit, i.e., the portable unit user is too far away from the vehicle. An example of the above situation may be that after all passengers get off the vehicle, and the doors are closed and locked, but the portable unit user unlocks the doors for one of the passengers who needs to fetch something left inside the vehicle. Afterward, the passenger closes the door, and the locking of the door is accomplished even if the portable unit user is not in the effective communication range.

2. Description of the Related Art

Recently, apparatus for remotely locking and unlocking doors of a vehicle with a portable unit that is capable of sending and receiving a radio signal have been in widely used.

For example, Japanese patent publication No. 3-55633 discloses a vehicle lock control apparatus which allows a controller built-in a vehicle and a portable unit to communicate with each other when an activating switch mounted on the outer surface of a driver-side door is operated, and which locks or unlocks the doors of the vehicle if a legitimate portable unit is present near the vehicle. As shown in FIGS. 9 and 10 of the publication, the disclosed vehicle lock control apparatus has a door opening/closing detecting means for preventing the vehicle from being unattended with unlocked doors due to malfunctioning of the activating switch or forgetting of the locking operation. Specifically, after confirming that the portable unit was near the driver-side door (near the vehicle) when the doors were opened or closed, the doors are automatically locked after a predetermined period of time has lapsed if the portable unit is not near the vehicle.

Japanese laid-open patent publication No. 2001-145017 discloses, as shown in FIGS. 6 through 9 of the publication, an apparatus for automatically locking the doors of a vehicle reliably when a portable unit user is positioned out of the communication range of the portable unit at the time the doors are closed and a door controller on the vehicle and the portable unit fail to communicate with each other, such as when the driver who is carrying the portable unit gets off the vehicle and quickly leaves the vehicle forcibly closing the door. The disclosed apparatus detects whether or not the portable unit is present in the passenger's compartment or in a predetermined range near the driver-side door when the driver-side door is opened and closed, and automatically locks the doors in various manners including the generation of a warning, based on the detected results in both the passenger's compartment and the predetermined range.

According to the conventional apparatus referred to above, the controller and the portable unit communicate with each other when the doors are opened and/or closed, and the doors are automatically locked based on the results of the communications. If the portable unit user or a passenger has forgotten something in the vehicle whose doors are locked, then when the portable unit user unlocks the doors with the activating switch and walks out of the communication range, and thereafter the portable unit user or the passenger opens and closes the assistant-side door or the door therebehind where no antenna is installed, the doors are not automatically locked, or the doors are automatically locked but a warning may be produced or not depending on the position of the portable unit user when the passenger closes and opens the door. Therefore, the automatic door locking function of the conventional apparatus is low in reliability or operationally limited.

SUMMARY OF THE INVENTION

It is therefore an object of the present invention to provide an automatic vehicle door locking/unlocking apparatus which is capable of automatically and reliably locking the doors of a vehicle even when a portable unit user walks out of the communication range of the portable unit after the portable unit user operates an activating member to unlock the doors, and then the portable unit user or a passenger opens or closes the doors.

In the summary of the invention described below, various parts of the automatic vehicle door locking/unlocking apparatus are denoted by reference characters in accompanying drawings for an easier understanding of the present invention. The elements described in the summary of the invention should not be interpreted as being limited to those parts denoted by the reference characters. The scope of the present invention should be understood as being limited only by the elements defined in the claims and their equivalents.

According to the present invention, an apparatus for automatically locking and unlocking doors of a vehicle, comprises: operation detecting means (20, step S3*c*) mounted on the vehicle at a position operable from outside of the vehicle, for detecting that the operation detecting means is operated, and outputting a signal indicating that the operation detecting means is operated; door opening detecting means (28, step S11) for detecting that at least one of the doors of the vehicle changes from a closed state to an open state, and outputting a signal indicating that the door changes from the closed state to the open state; vehicle-side transmitting means (30, 44, 46, 48, 50, 54, 56, 58, 60, step S3*d,* S12-*l*) for transmitting a transmission request signal in a predetermined range in the passenger's compartment of the vehicle and a predetermined range around the vehicle in response to the output signals from the operation detecting means and the door opening detecting means; a portable unit (18) for transmitting identification information upon reception of the transmission request signal; vehicle-side receiving means (30, 40, 42) for receiving the identification information transmitted from the portable unit (18); first position detecting means (step S3*e*) for determining whether the identification information received by the vehicle-side receiving means matches identification information stored by the vehicle or not in response to the output signal from the operation detecting means, and detecting the position of the portable unit based on the determined result; unlocking control means (step S3*f*) for unlocking the doors of the vehicle when the first position detecting means detects that the portable unit is present outside of the vehicle; second position detecting means (S13) for determining whether the identification information received by the vehicle-side receiving means matches the identification information stored by the vehicle or not in response to the output signal from the door opening detecting means, and detecting the position of the portable unit based on the determined result;

portable-unit-presence-detection vehicle-side transmitting means (step S12-3) for transmitting the transmission request signal in the predetermined ranges in the passenger's compartment and around the vehicle, if the second position detecting means detects the position of the portable unit in the predetermined ranges in the passenger's compartment and around the vehicle; third position detecting means (step S41) for determining whether the identification information received by the vehicle-side receiving means matches the identification information stored by the vehicle or not, and detecting the position of the portable unit based on the determined result during a period in which the portable-unit-presence-detection vehicle-side transmitting means is intermittently transmitting the transmission request signal; lock controlling means (step S47) for locking the doors of the vehicle when the third position detecting means detects that the portable unit is not present at least outside of the vehicle; and memory means (step S3*h*) for storing information indicating that the unlocking control means unlocked the doors of the vehicle; the portable-unit-presence-detection vehicle-side transmitting means comprising means (steps S17, S26, S30, S33, S35, S12-3) for transmitting the transmission request signal in the predetermined ranges in the passenger's compartment and around the vehicle even when the second position detecting means detects that the portable unit is not present in the predetermined ranges, if the memory means stores the information indicating that the unlocking control means unlocks the doors of the vehicle.

With the above apparatus, when the operation detecting means is operated to unlock the doors to open the doors, the portable unit is necessarily present in the predetermined range outside of the vehicle. The memory means (step S35) stores information indicating that the operation detecting means is operated to unlock the doors. If the memory means stores the information indicating that the operation detecting means is operated to unlock the doors, then the automatically locked based on the stored information. Consequently, when all the doors are closed and locked, and the user of the portable unit realizes something left in the vehicle, returns to the parked vehicle, touches a door sensor on the door on the driver's seat side to unlock the door, thereafter opens the door on the assistant's seat side or the door therebehind outside the effective transmission range (given range) around the vehicle, takes whatever he or she needs that is left in the vehicle, and then closes the door, if all the doors are closed, an automatic locking processing sequence is carried out to reliably lock the doors if the memory means stores the information indicating that the doors are unlocked upon the triggering of the operation detecting means, irrespective of whether the portable unit is present in the range in the passenger's compartment or the range around the vehicle when the position of the portable unit is detected upon the opening of the door. Thus, an oversight to lock the doors is prevented.

Therefore, an automatic door locking function has better reliability, and an oversight of locking the doors is prevented for increased security.

The apparatus may further comprise: all door closing detecting means (step S16) for detecting that at least one of doors of the vehicle changes from an open state to a closed state and all the doors are closed, and outputting a signal indicating that the door changes from the open state to the all door closed state; and fourth position detecting means (step S12-2, S20) for determining whether the identification information received by the vehicle-side receiving means matches the identification information stored by the vehicle or not in response to the output signal from the all door closing detecting means, and detecting the position of the portable unit based on the determined result; the portable-unit-presence-detection vehicle-side transmitting means comprising means (step S12-3) for transmitting the transmission request signal in the predetermined ranges in the passenger's compartment and around the vehicle when the fourth position detecting means detects that the portable unit is not present in the predetermined ranges (NO in step S20), if the second position detecting means detects that the portable unit is present in the passenger's compartment and around the vehicle or if the memory means stores the information indicating that the unlocking control means unlocks the doors of the vehicle.

Therefore, in response to the output signal from the all door closing detecting means which detects when at least one of doors of the vehicle changes from the open state to the closed state and all the doors are closed, the fourth position detecting means detects the position of the portable unit. If the fourth position detecting means detects when the portable unit is not present in the passenger's compartment, then the vehicle-side transmitting means transmits the transmission request signal in the predetermined ranges in the passenger's compartment and around the vehicle. Therefore, when the doors are open or the portable unit is present in the passenger's compartment, no transmission request signal is transmitted. Specifically, when the doors are open and do not need to be closed, or the user of the portable unit is on board and the doors do not need to be automatically locked, any unwanted transmission of transmission request signals is prevented, thus preventing the vehicle and the portable unit from wastefully consuming electric energy, i.e., from wasting electric energy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
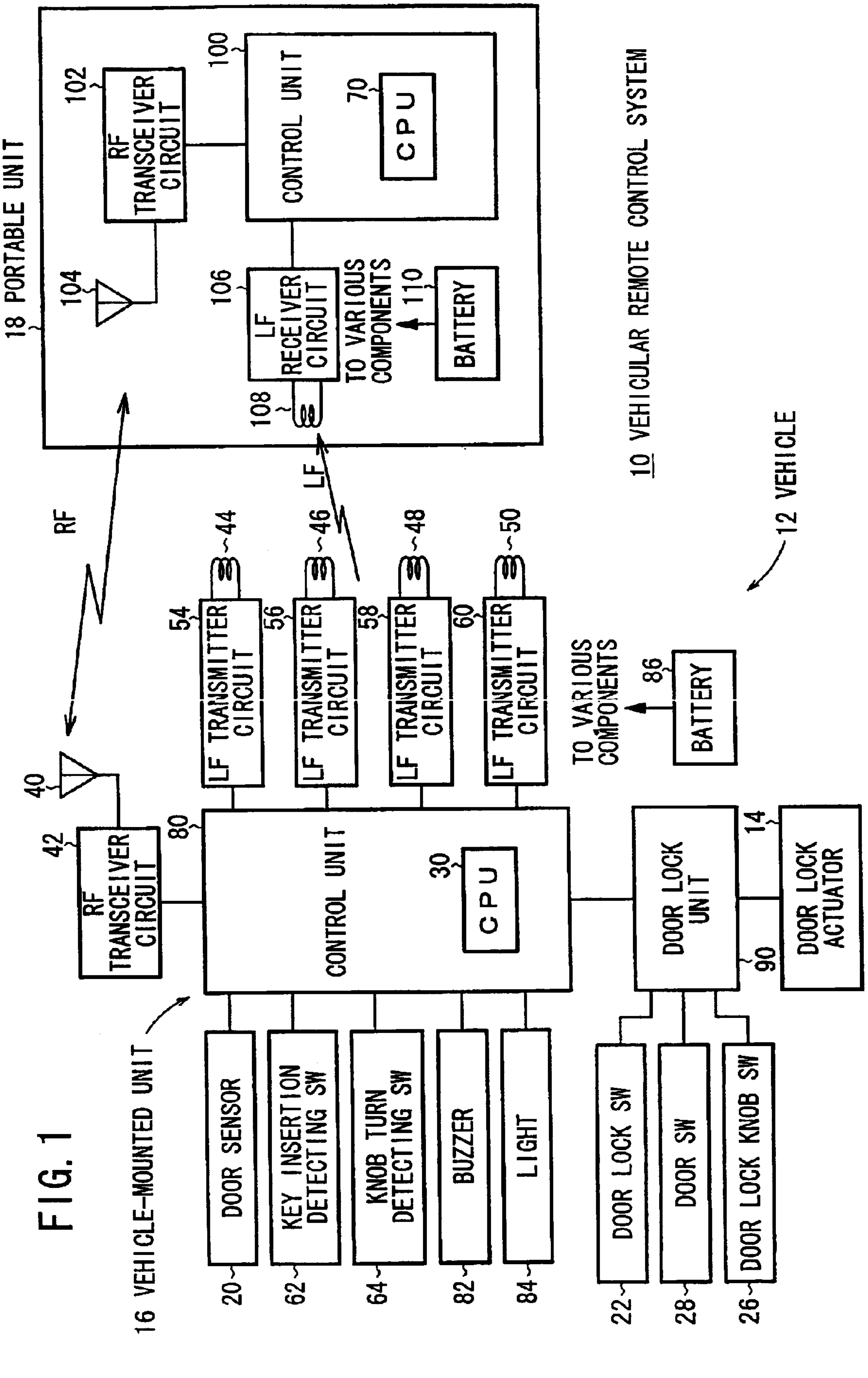
FIG. 1 is a block diagram of a vehicular remote control system incorporating therein an automatic vehicle door locking/unlocking apparatus according to an embodiment of the present invention.
Figure 2:
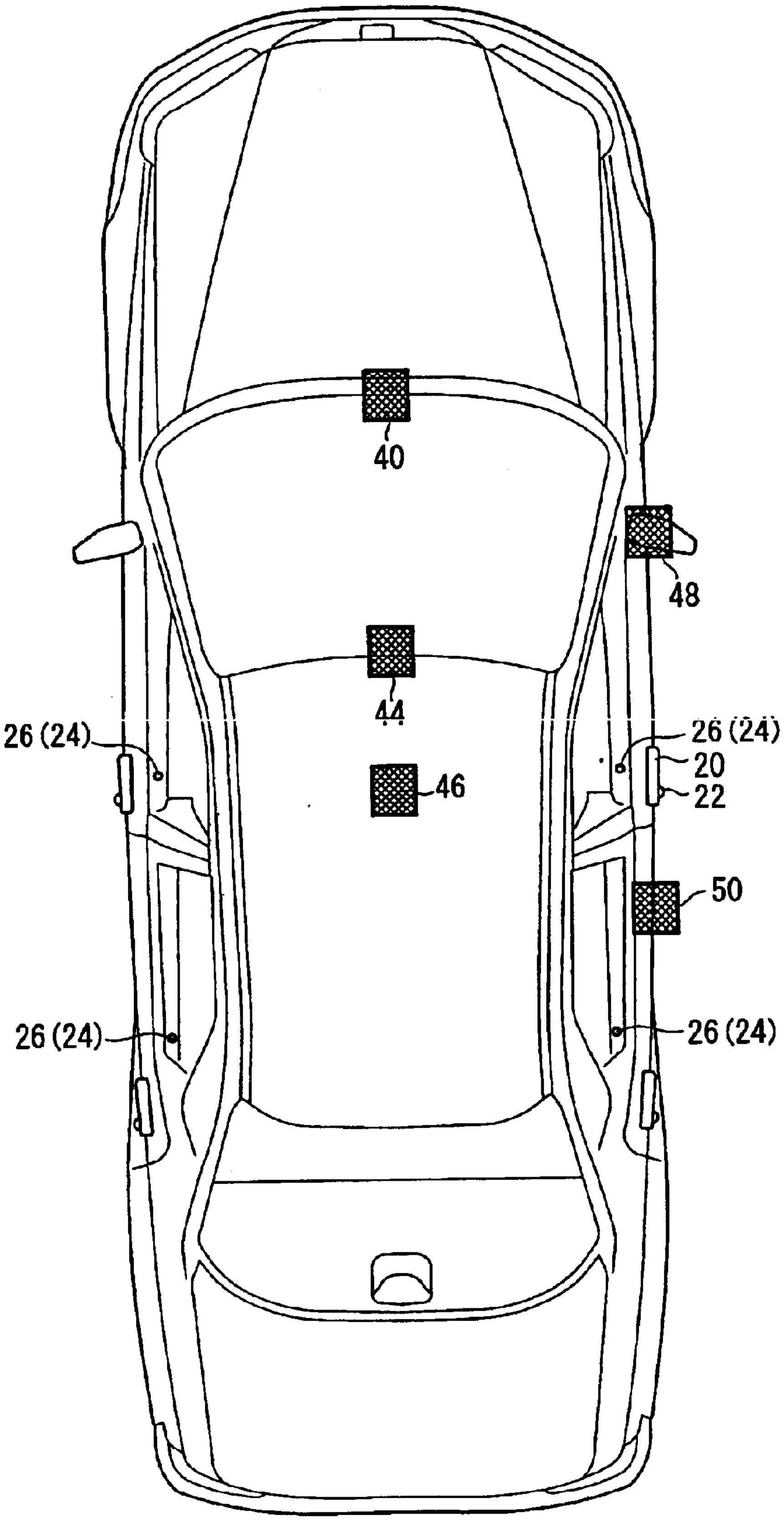
FIG. 2 is a plan view of a vehicle incorporating therein the vehicular remote control system shown in FIG. 1.
Figure 3:
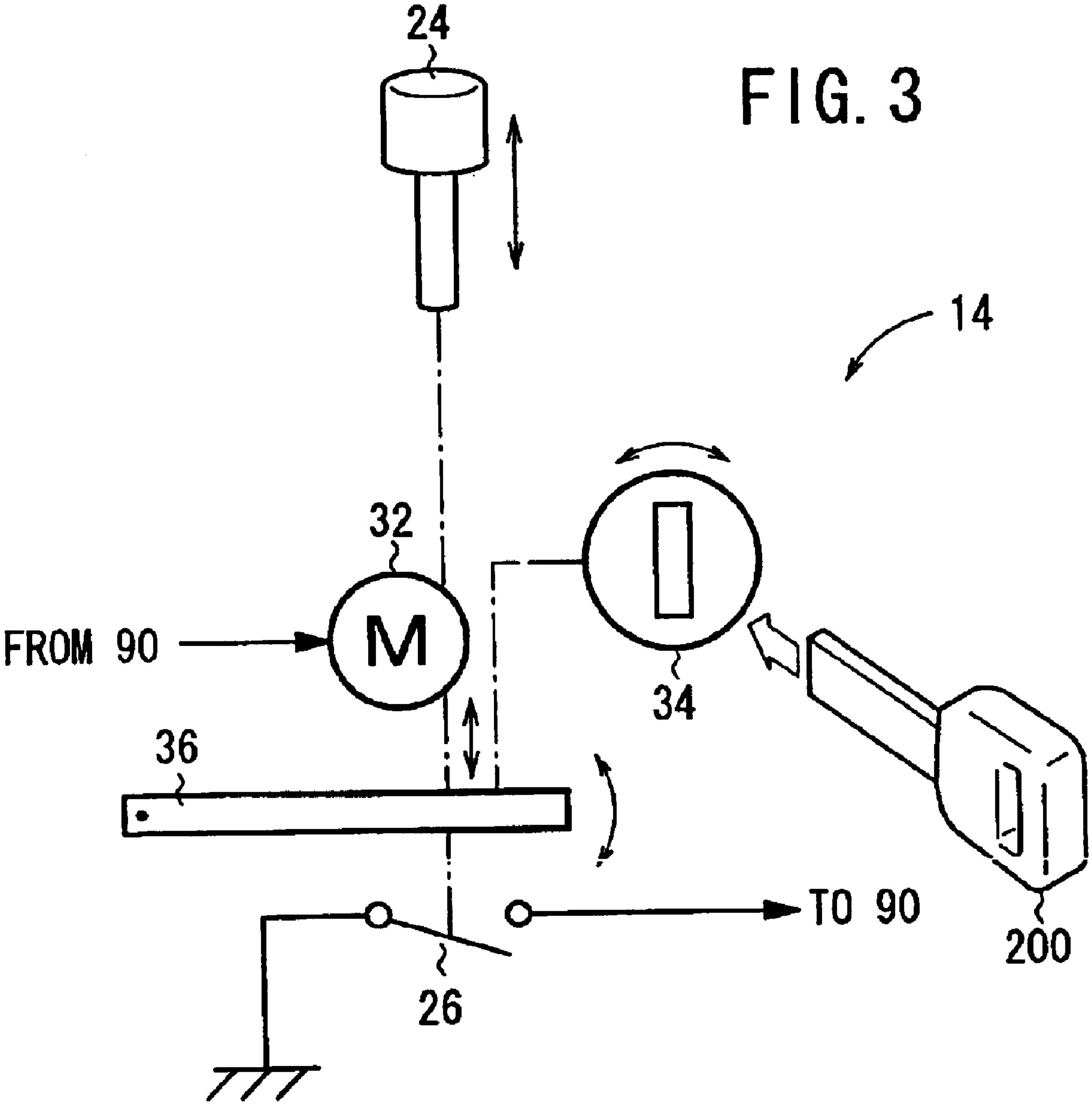
FIG. 3 is a schematic view of a door lock actuator for locking a door.

FIG. 1 shows in block form a vehicular remote control system 10 incorporating therein an automatic vehicle door locking/unlocking apparatus according to an embodiment of the present invention. FIG. 2 shows in plan a vehicle 12 incorporating therein the vehicular remote control system 10. FIG. 3 schematically shows a door lock actuator 14 for locking a door.

As shown in FIGS. 1 through 3, the vehicular remote control system 10 basically comprises a vehicle-mounted unit 16 as a vehicular controller mounted on a vehicle 12 and a portable unit 18 which is carried by the user, such as the driver, of the vehicle 12 for performing radio communications with the vehicle-mounted unit 16.

The portable unit 18 has a control unit 100 connected through an RF (radio frequency) transceiver circuit 102 to an RF antenna 104 for transmitting and receiving an RF signal having a frequency of 315 [MHz] and also connected through an LF receiver circuit 106 to an LF antenna 108 for receiving an LF (low frequency) signal having a frequency of 125 [kHz]. The portable unit 18 is powered by a replaceable cell 110 such as a button cell or the like. The portable unit 18 has a size that is about the same as a credit card incorporating an IC (Integrated Circuit) chip therein.

The vehicle-mounted unit 16 transmits an LF signal as a transmission request signal to the portable unit 18. The LF signal thus transmitted to the portable unit 18 wakes up (activates) the control unit 100 from a sleep mode. Since the control unit 100 stays in the sleep mode unless it is supplied with the LF signal from the vehicle-mounted unit 16, the portable unit 18 is an energy saver.

The RF signal is used in mutual communications between the portable unit 18, which is protected for security, and the vehicle-mounted unit 16, to enable the vehicle-mounted unit 16 to authenticate the portable unit 18 with identification information representative of an identification (ID) signal and a cryptographic code, and also to shorten the time required to authenticate the portable unit 18 via such mutual communications.

The LF signal can be transmitted within an effective transmission range of about 1 [m], and the RF signal can be transmitted an effective transmission range that is about several times the effective transmission range of the LF signal.

The vehicle 12 has a door sensor 20 (see also FIG. 2) which is to be triggered to unlock the doors of the vehicle 12 and a door lock switch 22 which is to be operated to lock the doors. The door sensor 20 and the door lock switch 22 are mounted on the outer door handle on a driver-side door of the vehicle 12.

The door sensor 20 is disposed on an inner surface of the outer door handle which faces the driver-side door, and comprises a touch sensor of the electrostatic capacitance change type. The door sensor 20 is normally turned off, and is turned on when a person triggers it, i.e., when a person's finger touches the inner surface of the outer door handle. The door lock switch 22 is disposed on an outer surface of the outer door handle which faces away from the driver-side door, and comprises a mechanical switch such as a microswitch or the like. The door lock switch 22 is normally turned off, and is turned on when a person operates it, i.e., when a person's finger presses a button thereof that is mounted on the outer surface of the outer door handle.

Each of the doors of the vehicle 12 has, in its door lining, a door lock knob switch 26 that is turned off to lock the door when a door lock knob 24 is manually pressed downwardly and turned on to unlock the door when the door lock knob 24 is manually pulled upwardly, and a door switch 28 for detecting whether the door is open or closed. The door lock knob switch 26 is turned off when the door is locked, and turned on when the door is unlocked. The door switch 28 is turned on when the door is open, and turned off when the door is closed.

As shown in FIG. 3, the door is locked or unlocked by a locking lever 36 that is turned a given angle when the door lock knob 24 that is connected to the locking lever 36 by a cam, gear, and link mechanism is moved downwardly or upwardly, or when a lock motor 32 that is connected to the locking lever 36 by a cam, gear, and link mechanism is energized or de-energized by a door lock unit 90, or when a key cylinder 34 that is connected to the locking lever 36 by a cam, gear, and link mechanism is manually turned clockwise or counterclockwise by an immobilizer key 200 inserted into the key cylinder 34.

The immobilizer key 200 comprises an ordinary mechanical key with a transponder incorporated in its grip. To start the engine of the vehicle 12 or energize accessories in the vehicle 12, the immobilizer key 200 can be inserted into a knob slot defined in a knob-type ignition assembly that is positioned near the steering wheel of the vehicle 12. When the immobilizer key 200 is inserted into the knob slot, the immobilizer key 200 and an immobilizer unit (not shown) control unit 80 attempt to communicate mutually with each other for authentication. After mutual communications for authentication are successfully carried out between them, when an ignition knob of the ignition assembly is turned by the immobilizer key 200 from an ignition on position to a start position, the engine of the vehicle 12 is started. Even when the immobilizer key 200 is not inserted into the knob slot, the portable unit 18 and the control unit 80 attempt to communicate mutually with each other for authentication. After mutual communications for authentication are successfully carried out between them, when the ignition knob of the ignition assembly is turned from the ignition on position to the start position, the engine of the vehicle 12 is started. The ignition knob can be turned successively through an off position, an ACC (accessory) position, an ignition position, and a start position as with known ignition cylinders.

To the control unit 80, there are connected a key insertion detecting switch 62 for detecting when the immobilizer key 200 is inserted into the knob slot and outputting a signal representing the detected insertion, and a knob turn detecting switch 64 for detecting when the ignition knob is turned and outputting a signal representing the detected turn.

The vehicle 12 also has an RF unit including an RF antenna 40 and an RF transceiver circuit 42 that are disposed below the surface of the instrument panel. Mutual RF communications for authentication are carried out between the control unit 80 of the vehicle-mounted unit 16 and the control unit 100 of the portable unit 18 when an RF signal transmitted from the vehicle 12 through the RF antenna 40 is received by the portable unit 18 through the RF antenna 104 and an RF signal transmitted from the portable unit 18 through the RF antenna 104 is received by the vehicle 12 through the RF antenna 40.

The vehicle-mounted unit 16 further includes an LF antenna 44 for intravehicular communications (intravehicular LF antenna) mounted on a central vehicle floor at front seats of the vehicle 12, an intravehicular LF antenna **46*b* mounted on a vehicle floor at rear seats of the vehicle 12, an LF antenna 48 for extravehicular communications (extravehicular LF antenna) mounted on a door mirror on the driver-side door of the vehicle 12, and extravehicular LF antenna 50 mounted on the door lining of the door behind the driver-side door. The vehicle-mounted unit 16 also includes LF transmitter circuits 54, 56, 58, 60 connected respectively to the intravehicular LF antenna 44, the intravehicular LF antenna 46, the extravehicular LF antenna 48, and the extravehicular LF antenna 50. LF signals which are supplied from the LF transmitter circuits 54, 56, 58, 60 are transmitted respectively through the intravehicular LF antenna 44, the intravehicular LF antenna 46, the extravehicular LF antenna 48, and the extravehicular LF antenna 50 to the portable unit 18, and received by the LF receiver circuit 106 through the LF antenna 108. In this manner, request signals for requesting the transmission of an identification signal are transmitted from the vehicle-mounted unit 16 to the portable unit 18**.

Figure 4:
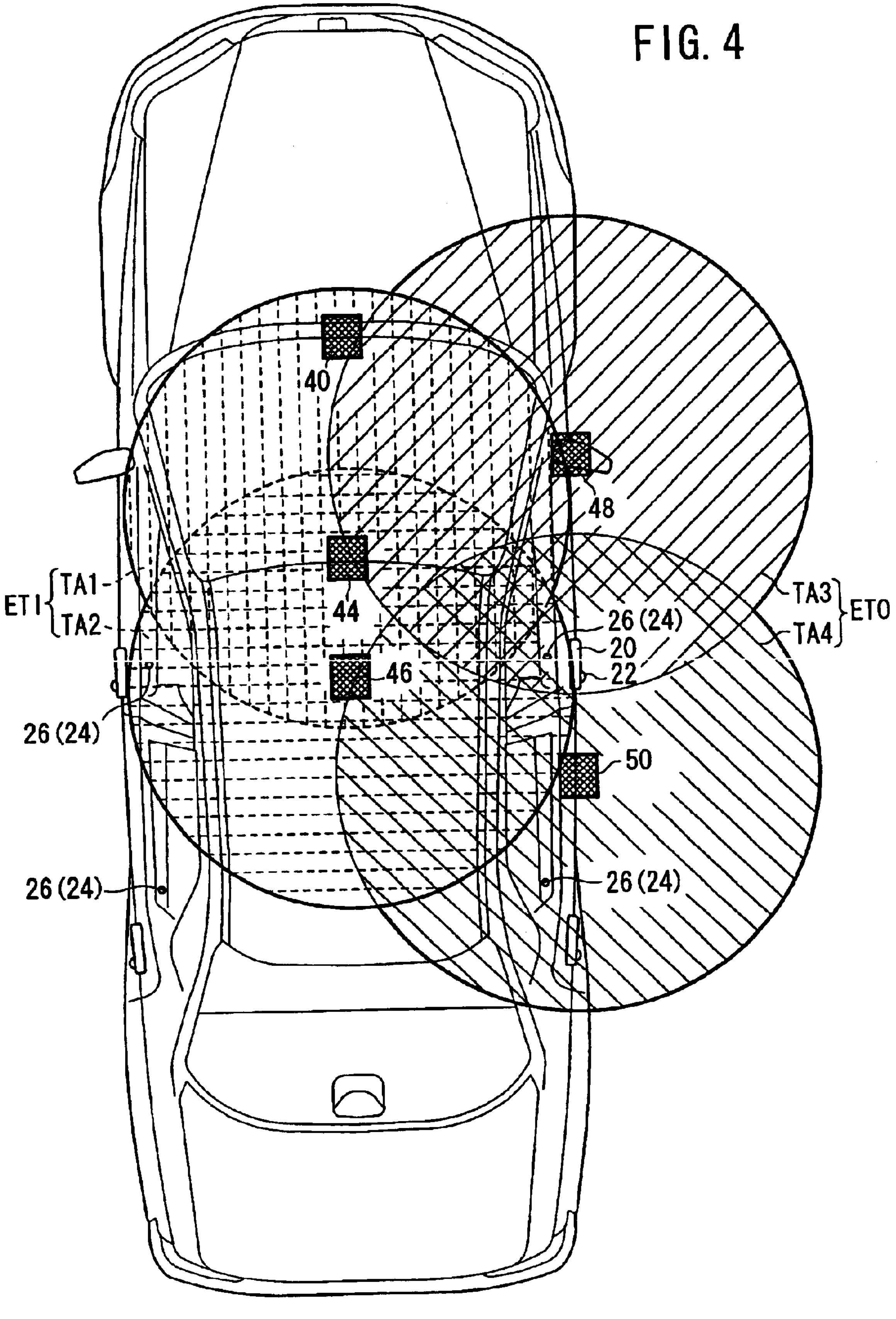
FIG. 4 is a plan view illustrative of effective transmission ranges of transmission antennas for transmitting intravehicular and extravehicular LF signals.

FIG. 4 shows effective transmission ranges TA1–TA4 of the LF antennas 44, 46, 48, 50 for request signals to be transmitted from the LF antennas 44, 46, 48, 50 to the portable unit 18 to request the portable unit 18 to transmit signals. The effective transmission ranges TA1, TA2 of the intravehicular LF antennas 44, 46 are limited within the passenger compartment of the vehicle 12. The effective transmission ranges TA3, TA4 of the extravehicular LF antennas 48, 50 are limited within predetermined circular spaces outside the vehicle 12, each having a diameter which is substantially equal to the arm's length of the driver of the vehicle 12.

When the portable unit 18 is located within the vehicle 12, the position of the portable unit 18 can be detected in a range ETI enclosed by the thick solid line representing the effective transmission ranges TA1, TA2 of the intravehicular LF antennas 44, 46 for request signals. The range ETI is placed within the passenger's compartment of the vehicle 12 and also referred to as within the passenger's compartment. When the portable unit 18 is located outside the vehicle 12, the position of the portable unit 18 can be detected in a range ETO outside the vehicle 12 which is enclosed by the thick solid line representing the effective transmission ranges TA3, TA4 of the extravehicular LF antennas 48, 50 for request signals. The range ETO is also referred to as near the vehicle, near the doors, or around the vehicle.

The effective transmission ranges for request signals are ranges in which the portable unit 18 can receive request signals that are transmitted from the LF antennas 44, 46, 48, 50.

An effective transmission/reception range for an RF signal is a circular range around the position of each of the RF antennas 40, 104, the circular range having a diameter of about 5 [m]. Therefore, the effective transmission/reception range is much greater than the effective transmission ranges for request signals.

The effective transmission/reception range for an RF signal is a range in which the portable unit 18 or the vehicle-mounted unit 16 can receive an RF signal that is transmitted from the vehicle-mounted unit 16 or the portable unit 18.

As shown in FIG. 1, the vehicle-mounted unit 16 also has a control unit 80 for controlling the vehicular remote control system 10 in its entirety and a door lock unit 90 which coacts with the control unit 80. The control unit 80 and the door lock unit 90 may be of an integral structure.

To the control unit 80, there are connected the RF transceiver circuit 42, the LF transmitter circuits 54, 56, 58, 60, the door sensor 20, a buzzer 82, and a light 84. When the doors are properly locked, the buzzer 82 produces a single beep to indicate that the doors are properly locked. The buzzer 82 also produces a succession of six beeps as a warning. When the doors are automatically locked, the buzzer 82 and the light 84 are simultaneously turned on for answer back, i.e., the buzzer 82 produces a beeping sound and the light 84 flickers.

To the door lock unit 90, there are connected the door switches 28, the door lock switch 22, the door lock knob switches 26, and the door lock actuators 14.

The components of the vehicle-mounted unit 16 are supplied with electric energy from a battery 86 mounted on the vehicle 12.

Each of the control units 80, 100 and the door lock unit 90 has a CPU (Central Processing Unit), a ROM (Read Only Memory), a RAM (Random Access Memory), a clock generator, a counter, and a timer. The CPU automatically carries out a series of calculations or a data processing operation according to a program and data stored in the ROM.

For an easier understanding of the present invention, the vehicle-mounted unit 16 is controlled by a CPU 30 of the control unit 80 including the door lock unit 90, and the portable unit 18 is controlled by a CPU 70 of the control unit 100.

The vehicular remote control system 10 which incorporates therein the automatic vehicle door locking/unlocking apparatus according to the present embodiment is basically arranged and operates as described above. More detailed arrangement and operation of the vehicular remote control system 10 will be described below with reference to flowcharts.

Figure 5:
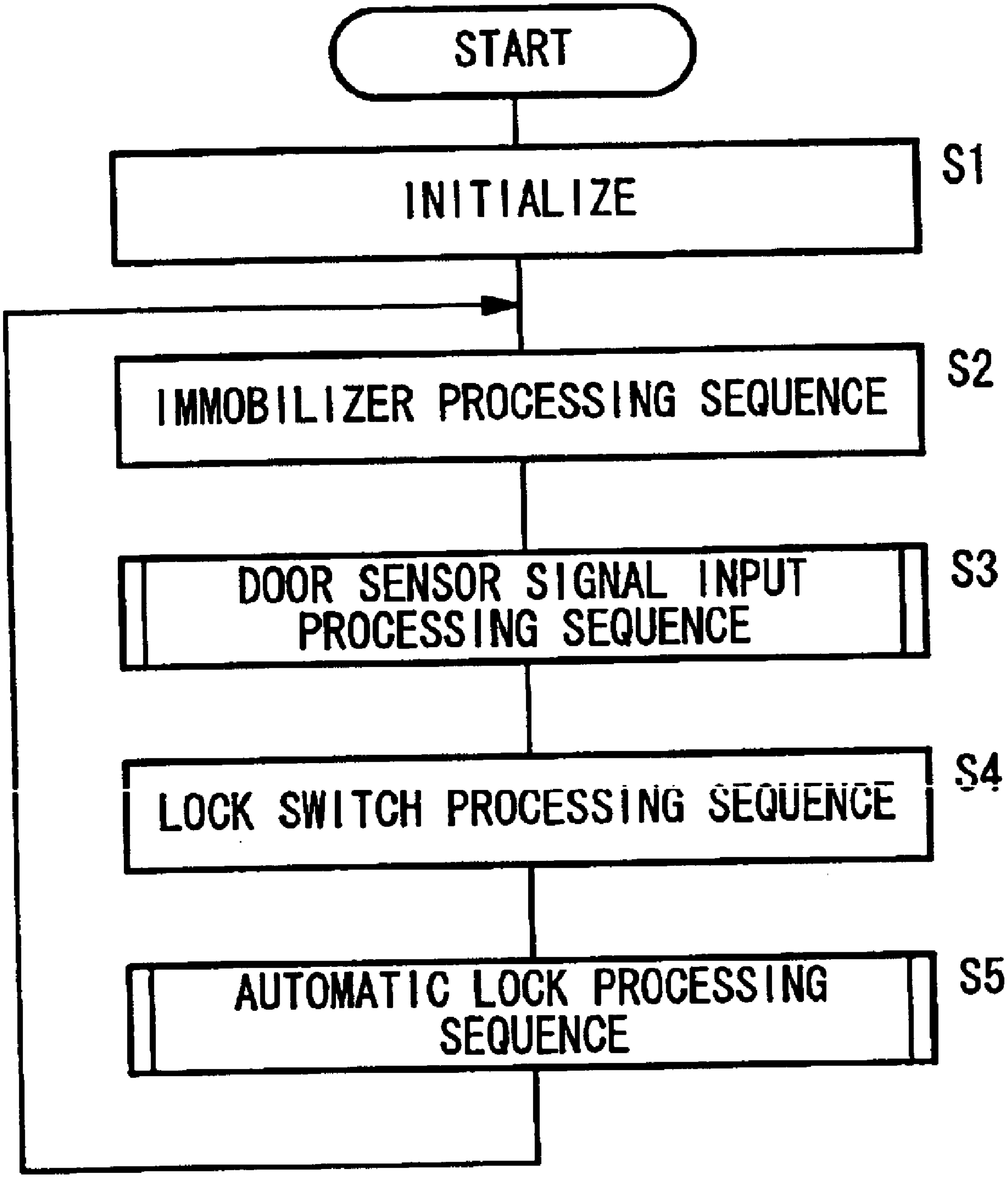
FIG. 5 is a flowchart of a general processing sequence of a program which is mainly executed by a CPU of a control unit and additionally executed by a CPU of a portable unit.

FIG. 5 is a flowchart of a general processing sequence of a program which is mainly executed by the CPU 30 of the vehicle-mounted unit 16 and additionally executed by the CPU 70 of the portable unit 18.

In step S1, when the battery 86 is connected to the accessories in the vehicle 12 including the vehicle-mounted unit 16 and supplies electric energy to activate the CPU 30, the CPU 30 carries out an initializing process. In the initializing process, the CPU 30 sets various variables, a timer, a counter, etc. to initial values.

When the replaceable cell 110 such as a button cell or the like is placed in the portable unit 18, it is initialized. After the portable unit 18 is initialized, the CPU 70 enters a sleep mode, i.e., a mode to wait for activation. When the portable unit 18 receives a request signal (LF signal) transmitted from the vehicle-mounted unit 16, it wakes up (activates) the CPU 70 from the sleep mode. To avoid complexity in understanding the present embodiment, the CPU 70 and the CPU 30, which are entities for executing the program, will basically not be referred to in the description of the processing sequence.

After the initializing process in step S1, steps S2 through S5 ranging from an immobilizer process to an automatic locking process are periodically repeated.

In an immobilizer processing sequence in step S2, a process for permitting a startup of the engine of the vehicle 12 is carried out.

In a door sensor signal input processing sequence in step S3, a process for unlocking the doors based on a triggering of the door sensor 20 is carried out.

In a lock switch processing sequence in step S4, a process of locking the doors based on an operation of the door lock switch 22.

In an automatic locking processing sequence in step S5, a process for automatically locking the doors is carried out. Basically, in the automatic locking processing sequence, the user of the portable unit 18 gets off the vehicle 12 and closes all the doors. When the portable unit user walks out of the effective transmission ranges for request signals that are transmitted from the vehicle 12, all the doors of the vehicle 12 are automatically locked. Since the doors are automatically locked, an oversight of locking the doors on the part of the portable unit user is prevented.

Major flags and counter that are used in the flowchart will be described below.

A door sensor unlock flag Fu is a flag that serves primarily to supplement the state or result of the door sensor 20. The door sensor unlock flag Fu is set (Fu←1) when the doors are unlocked by triggering the door sensor 20.

A portable unit presence confirmation flag Fk is a flag for storing data as to whether the portable unit 18 is present or not, and primarily identifying whether the automatic locking process is valid or invalid. The portable unit presence confirmation flag Fk is set when the portable unit 18 is detected as being present in the range ETI (FIG. 4) within the passenger's compartment or the range ETO around the vehicle 12.

In relation to the portable unit presence confirmation flag Fk, an in-compartment portable unit flag Fki is set when the portable unit 18 is detected as being present in the range ETI within the passenger's compartment, and an around-vehicle portable unit flag Fko is set when the portable unit 18 is detected as being present in the range ETO around the vehicle 12.

Therefore, when either the in-compartment portable unit flag Fki or the around-vehicle portable unit flag Fko is set, the portable unit presence confirmation flag Fk is simultaneously set.

An automatic lock counter Cw is set {Cw=30 [counts, one count per second]} when an activating condition for shifting to a mode for intermittently transmitting request signals is satisfied. The automatic lock counter Cw is counted down by one in each second. When an automatic locking condition is satisfied within 30 seconds or when an automatic locking condition is satisfied upon elapse of 30 seconds, the doors are automatically locked. When an automatic locking condition is not satisfied within 30 seconds, the automatic lock counter Cw is cleared (Cw=0).

In the present embodiment, the door sensor signal input processing sequence in step S3 and the automatic locking processing sequence in step S5 will be described in detail below. The immobilizer processing sequence in step S2 and the lock switch processing sequence in step S4 will not be described in detail below as they have no direct relevance to the present embodiment.

Figure 6:
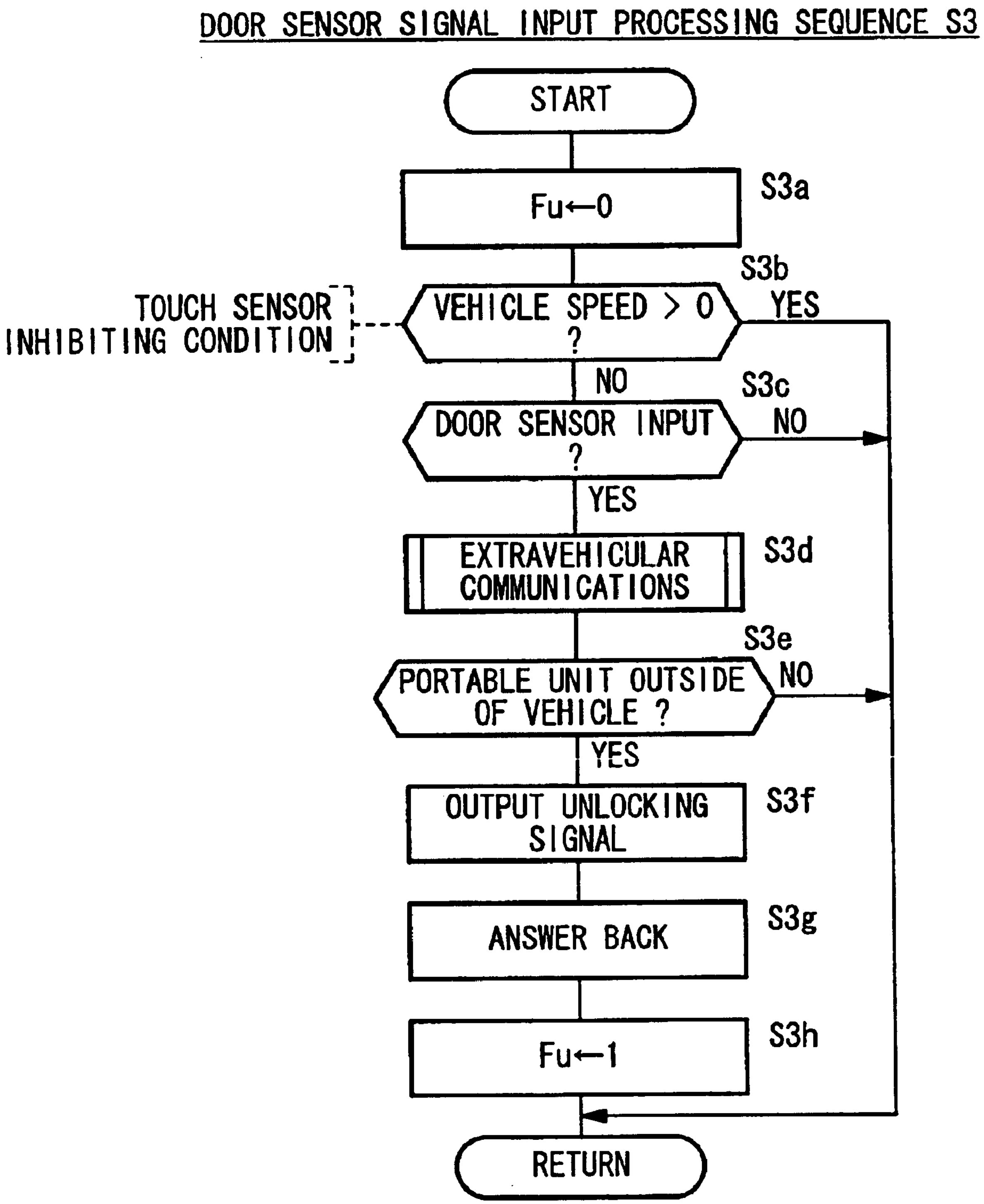
FIG. 6 is a detailed flowchart of a door sensor signal input processing sequence in the general processing sequence.

FIG. 6 shows in detail the door sensor signal input processing sequence in step S3 of the general processing sequence.

When the door sensor signal input processing sequence in step S3 is started, the door sensor unlock flag Fu is compulsorily cleared (Fu←0) in step S3*a*.

In step S3*b*, it is determined whether the vehicle speed read from a speedometer (not shown) on the vehicle exceeds 0 [km/h] (vehicle speed>0) or not. If the vehicle 12 is in motion, then it is judged that no human input action has been made on the door sensor 20, and control goes to the lock switch processing sequence in step S4, skipping step S3*c* and the following steps.

If it is judged that the vehicle 12 is at rest in step S3*b*, then control goes to step S3*c* to confirm whether there is an input action on the door sensor 20 or not. If there is no input action on the door sensor 20, then control goes to the lock switch processing sequence in step S4, skipping step S3*d* and the following steps.

If there is an input action on the door sensor 20, i.e., if the door sensor 20 is touched and its electrostatic capacitance is changed, an extravehicular communication processing sequence between the vehicle-mounted unit 16 and the portable unit 18 is carried out in step S3*d*.

The door sensor 20 is touched, i.e., the outer door handle is gripped, by the user of the portable unit 18 usually for the purpose of opening the door when all the doors of the vehicle 12 have been locked.

Figure 7:
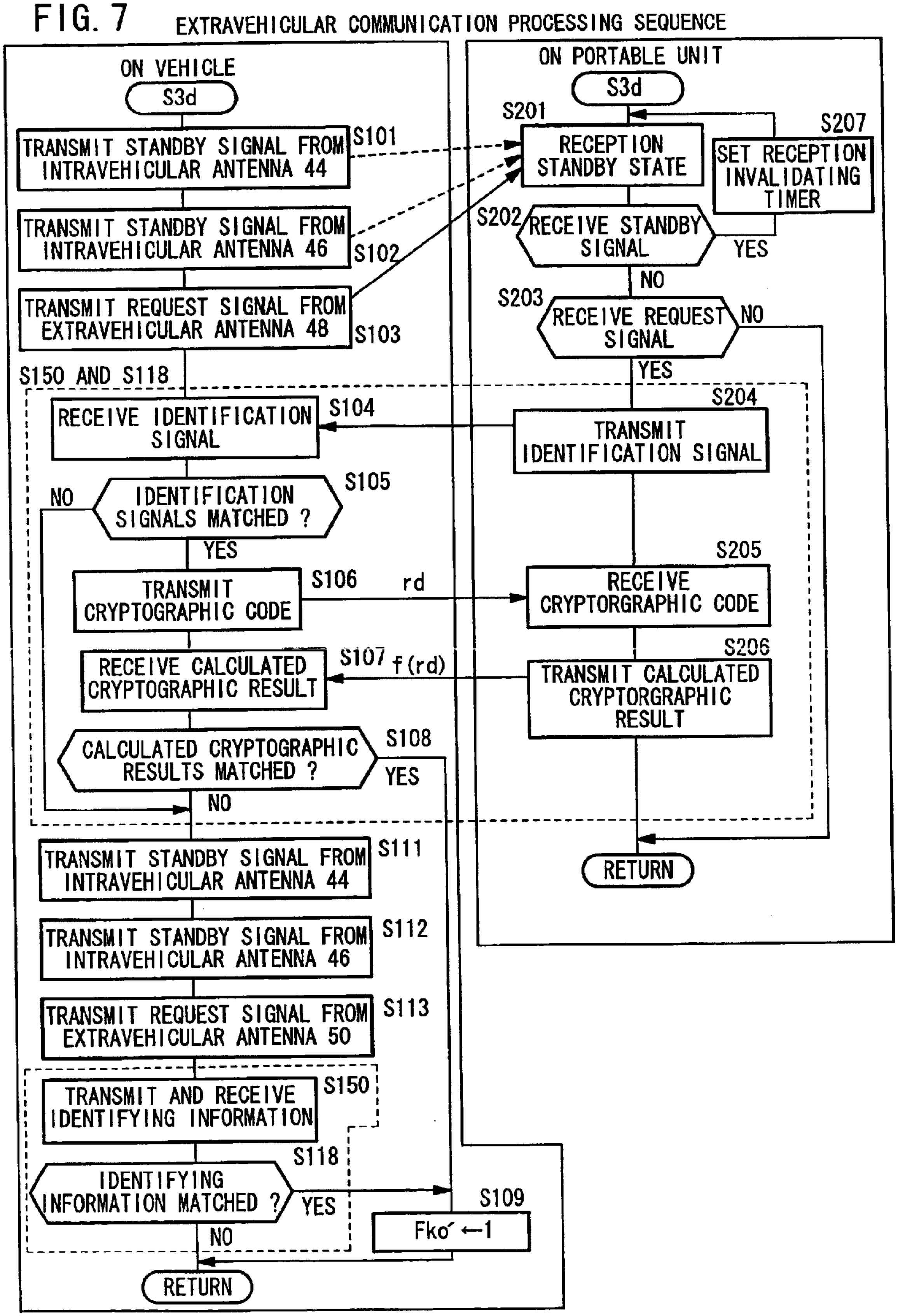
FIG. 7 is a detailed flowchart of an extravehicular communication processing sequence.

FIG. 7 shows in detail the extravehicular communication processing sequence in step S3*d*. The extravehicular communication processing sequence is basically a mutual communication that is carried out between the vehicle-mounted unit 16 and the portable unit 18 for authentication when request signals are transmitted from the LF antennas 48, 50 of the vehicle-mounted unit 16 to the LF antenna 108 of the portable unit 18 to activate the portable unit 18.

The extravehicular communication processing sequence is a process for detecting the legitimate portable unit 18, which has been authenticated, that is possibly positioned in the area ETO around the vehicle 12 and outside of the vehicle 12, or stated otherwise, that is possibly positioned in the area ETO around the vehicle 12, except its region that overlaps the range ETI within the passenger's compartment as shown in FIG. 4.

In step S101, the intravehicular LF antenna 44 transmits a standby signal in the effective transmission range TA1. In step S102, the intravehicular LF antenna 46 transmits a standby signal in the effective transmission range TA2. In step S103, the extravehicular LF antenna 48 transmits a request signal for requesting the transmission of an identification signal in the range ETO around the vehicle 12.

Thus, the standby signal from the intravehicular LF antenna 44, the standby signal from the intravehicular LF antenna 46, and the request signal from the extravehicular LF antenna 48 are successively transmitted in steps S101, S102, S103, respectively.

If it is judged that the portable unit 18, which is in a reception standby mode in step S201, receives the standby signal in step S202, a reception invalidating timer is set in step S207, bringing the LF receiver circuit 106 into a reception inhibiting mode and de-energizes the RF transceiver circuit 102, until the reception invalidating timer is unset upon reception of the standby signal. Therefore, if the portable unit 18 is positioned in the passenger's compartment, since it does not receive the request signal, it is inhibited from returning (transmitting) an RF signal. Consequently, if the portable unit 18 is positioned in the passenger's compartment, i.e., if the driver with the portable unit 18 is seated at the driver's seat, the vehicle-mounted unit 16 and the portable unit 18 are prevented from communicating with each other even when a person without the portable unit 18 (portable unit non-user) touches the door sensor 20 from the outside of the vehicle 12. Thus, the portable unit non-user is prevented from unlocking the door. At the same time, as the RF transceiver circuit 102 is de-energized, electric energy consumed by the portable unit 18 is reduced.

Figure 8:
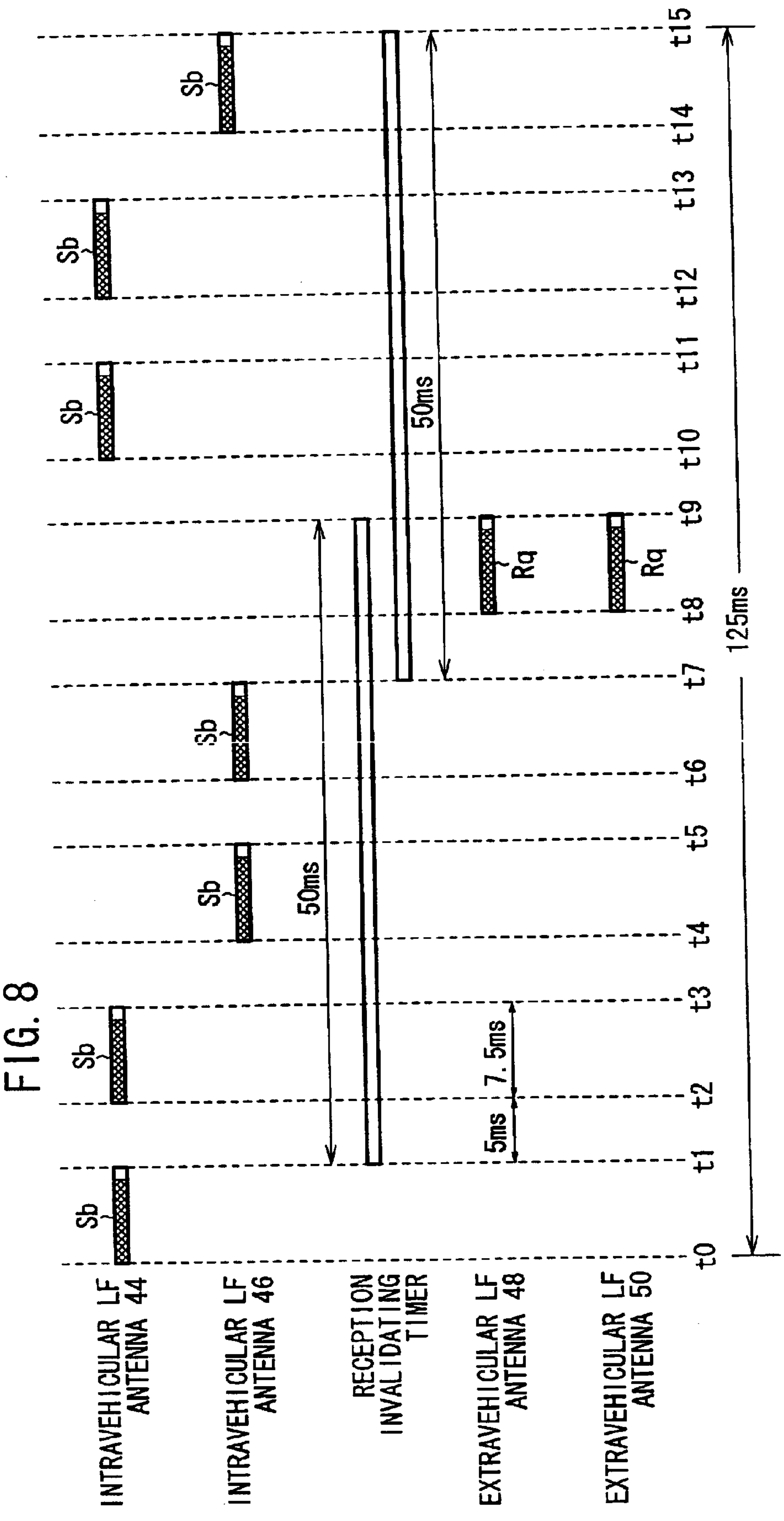
FIG. 8 is a timing chart illustrative of a standby signal processing sequence.

The above standby signal processing sequence will be described in detail below with reference to FIG. 8. A standby signal Sb having a duration of 7.5 [ms] is transmitted from the intravehicular LF antenna 44 twice at an interval of 5 [ms] between times t0 to t3 Thereafter, a standby signal Sb is transmitted from the intravehicular LF antenna 46 twice at an interval of 5 [ms] between times t4 to t7.

5 [ms] after the standby signal Sb is transmitted from the intravehicular LF antennas 44, 46, a request signal Rq having a duration of 7.5 [ms] is transmitted from the extravehicular LF antenna 48 between times t8 to t9.

Thereafter, a standby signal Sb is transmitted from the intravehicular LF antennas 44, 46 three times at intervals of 5 [ms] between times t10 to t15.

The CPU 70 determines whether the transmitted signal is a standby signal Sb or a request signal Rq based on a tail end 3-bit code (blank area) of the signal of 7.5 [ms]. The signal also includes a burst signal (hatched area) used for synchronization prior to the tail end 3-bit code.

When the portable unit 18 receives a standby signal Sb, it sets the reception invalidating timer to a time of 50 [ms]. As can be understood from FIG. 8, the portable unit 18 which has received a standby signal Sb does not receive a request signal Rq. For example, when the portable unit 18 receives a standby signal Sb between times t0 to t1, it does not receive a request signal Rq up to time t9, and when the portable unit 18 receives a standby signal Sb between times t6 to t7, it does not receive a request signal Rq up to time t15. Since the portable unit 18 in the passenger's compartment is controlled so as not to transmit and receive RF signals in coaction with a received standby signal Sb and the reception invalidating timer, the portable unit 18 is prevented from wasting electric energy.

The standby signal Sb is transmitted twice from each of the intravehicular LF antennas 44, 46 because it can be transmitted without being affected by noise.

If the portable unit 18 does not receive a standby signal Sb, then the answer to step S202 becomes negative. Control goes to step S203 to determine whether the portable unit 18 has received a request signal Rq or not. If the portable unit 18 has not received a request signal Rq, then control goes back to the reception standby mode in step S201.

In the extravehicular communication processing sequence shown in FIG. 7, a request signal Rq, destined for the portable unit 18 in the range ETO around the vehicle 12 where a standby signal Sb is not received, is transmitted from the extravehicular antenna 48 to the range ETO around the vehicle 12 in step S103. If the CPU 70 judges that the transmitted request signal Rq is received by the portable unit 18 in step S203, then an ID inherent in the portable unit 18, which serves as a response signal for the request signal, is read from the ROM and transmitted as an identification signal through the RF transceiver circuit 102 from the RF antenna 104 to the vehicle-mounted unit 16 in step S204.

In step S104, the vehicle-mounted unit 16 receives the identification signal through the RF antenna 40. Then, in step S105, the vehicle-mounted unit 16 determines whether the received identification signal agrees with an identification signal stored in the ROM of the vehicle-mounted unit 16. Usually, the ROM in the control unit 80 stores several identification signals. Only the legitimate portable unit 18, which stores in its ROM the ID that agrees with one of the identification signals stored in the control unit 80, is capable of carrying out mutual communications with the vehicle 12 by way of RF signals.

If it is judged that the received identification signal agrees with an identification signal stored in the ROM of the vehicle-mounted unit 16 in step S105, then the CPU 70 generates a cryptographic code rd (random number) and transmits the cryptographic code rd as an RF signal through the RF transceiver circuit 42 from the RF antenna 40 to the portable unit 18 in step S106. In step S205, the portable unit 18 receives the cryptographic code rd in the form of an RF signal through the RF antenna 104.

In step S206, the CPU 70 of the portable unit 18 substitutes the cryptographic code rd as a variable x in a function f(x) stored in its ROM and calculates a function value f(rd). The CPU 70 then transmits the calculated function value f(rd) as a calculated cryptographic result in the form of an RF signal from the RF antenna 104, thus completing the extravehicular communication in the portable unit 18.

The vehicle-mounted unit 16 then receives the function value f(rd) through the RF antenna 40 in step S107.

In step S108, the vehicle-mounted unit 16 determines whether the received function value f(rd), i.e., the received calculated cryptographic result, agrees with its calculated function value or not. Specifically, the CPU 30 of the vehicle-mounted unit 16 also substitutes a cryptographic code rd generated by itself in a function f(x) stored in its ROM, calculates a function value f(rd), and determines whether the calculated function value f(rd) agrees with the received calculated cryptographic result or not.

If it is judged that the calculated function value f(rd) agrees with the received calculated cryptographic result, then an outside-vehicle portable unit flag Fko' is set (Fko'←1) in step S109. The outside-vehicle portable unit flag Fko' is a flag indicating that the portable unit 18 is in a range outside of the vehicle 12, and its reference characters are primed in order to distinguish it from the range ETO around the vehicle 12. Mutual authentication is carried out, putting an end to the extravehicular communication processing sequence of step S3*d* shown in FIG. 6.

In step S3*e*, it is determined whether the portable unit 18 is positioned in the vicinity of the vehicle 12 or not based on whether the outside-vehicle portable unit flag Fko' is set or not. If mutual authentication is successful and the outside-vehicle portable unit flag Fko' is set in step S109, then the answer to step S3*e* is affirmative, and the CPU 30 of the control unit 80 outputs a door unlocking signal in step S3*f*.

The door lock unit 90 rotates the lock motor 32 of the door actuator 14 in a door unlocking direction, angularly displacing the locking lever 36 off the door lock. The door can now be opened by pulling the outer door handle.

In step S3*g*, the answer back process as described above is carried out to indicate that the doors are properly unlocked to the user of the portable unit 18. That is, the buzzer 82 and the light 84 are simultaneously turned on for answer back, i.e., the buzzer 82 produces a single beeping sound and the light 84 flickers twice.

In step S3*h*, the door sensor unlock flag Fu is set (Fu←1) indicating that the doors are unlocked by the operating of the door sensor 20. The door sensor signal input processing sequence in step S3 shown in FIG. 6 is now put to an end.

If the received identification signal does not agree with the identification signal stored in the ROM of the vehicle-mounted unit 16 in step S105, or if the cryptographic result calculated by the CPU 30 does not agree with the received calculated cryptographic result in step S108, then a processing similar to steps S101 through S108 is carried out in steps S111, S112, S113, S150, S118 in order to determine whether the portable unit 18 is near the rear seat of the vehicle 12, rather than the door mirror of the vehicle. Specifically, it is confirmed in step S113 whether the legitimate portable unit 18 is in the range ETO around the vehicle 12 with respect to the effective transmission range TA4 of the LF antenna 50 that is mounted on the door lining of the door behind the driver-side door.

When the door sensor 20 is operated in the door sensor signal input processing sequence in step S3, if the user of the portable unit 18 is not near the door, or more accurately, if the user of the portable unit 18 is not in the range ETO around the vehicle 12 except the region that overlaps with the range ETI within the passenger's compartment, then since the answer to step S3*e* is negative, the doors are not unlocked. Therefore, a person without the portable unit 18 is prevented from unlocking the door by touching the door sensor 20.

The identification information referred to in claims corresponds to the identification signal or the calculated cryptographic result, and the flow from steps S104 to S108 is represented by steps S150, S118. Specifically, step S150 indicating a process of transmitting and receiving the identification information corresponds to steps S104, S106, S107, and step S118 for determining whether the received identification information matches calculated identification information corresponds to steps S105, S108.

Figure 9:
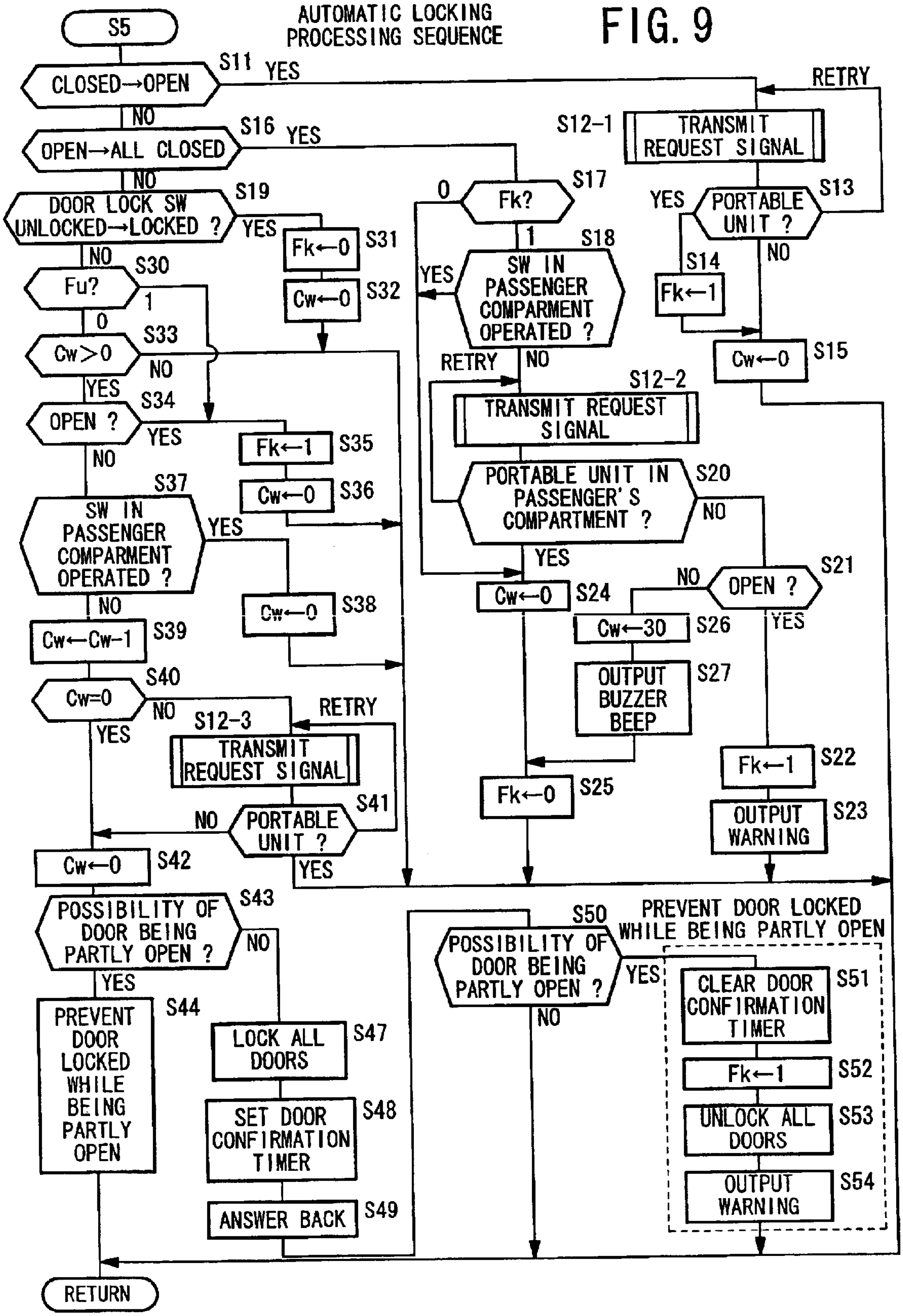
FIG. 9 is a basic flowchart of an overall automatic locking processing sequence in the general processing sequence.

FIG. 9 shows an overall automatic locking processing sequence in step S5.

FIGS. 10 through 14 show in detail the automatic locking processing sequence shown in FIG. 9.

Figure 15:
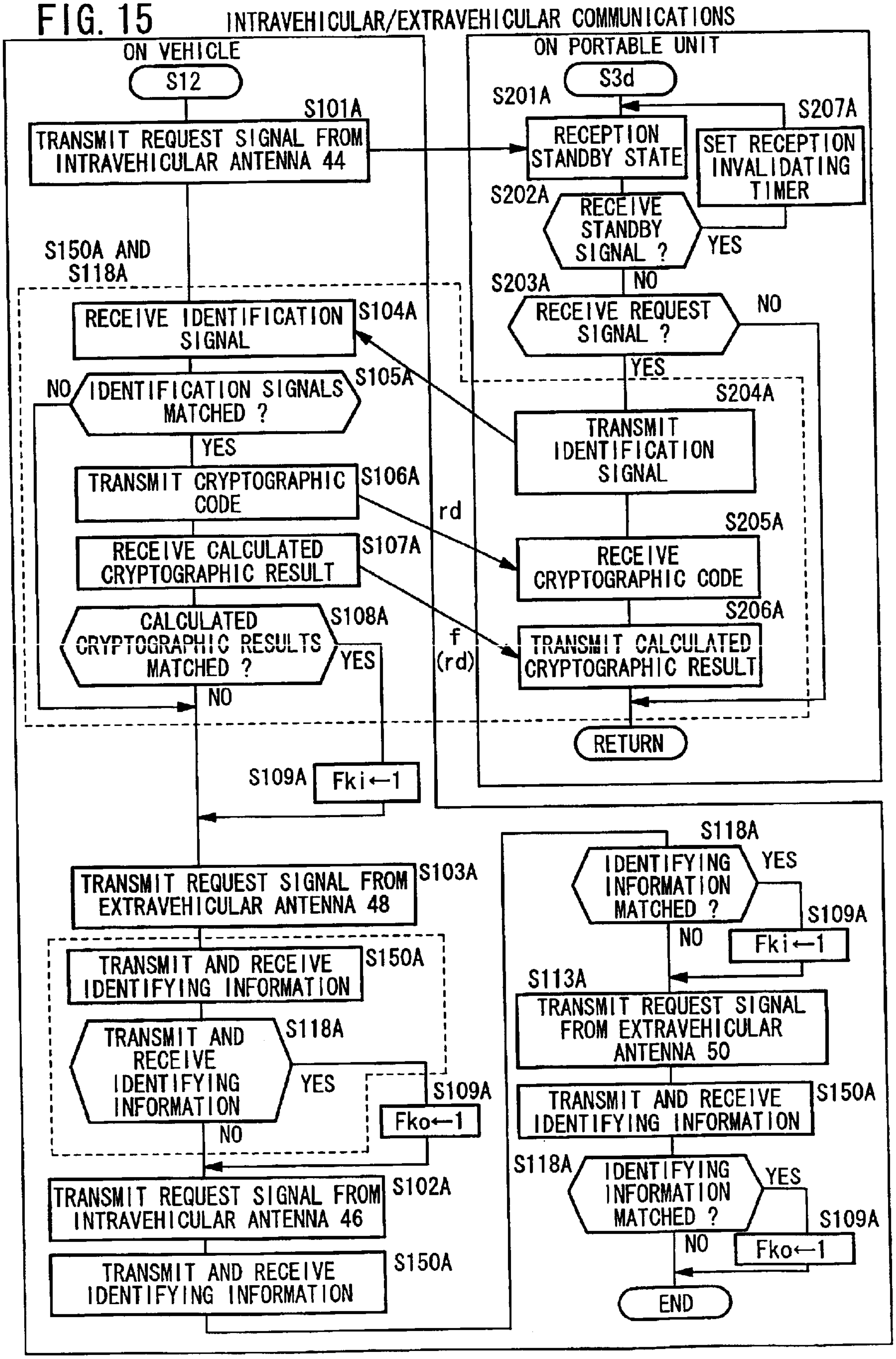
FIG. 15 is a detailed flowchart of an intravehicular/extravehicular communication processing sequence to be executed between a vehicle-mounted unit and a portable unit.

FIG. 15 shows in detail an intravehicular/extravehicular communication processing sequence to be executed between the vehicle-mounted unit 16 and the portable unit 18. Since the intravehicular/extravehicular communication processing sequence is carried out in the automatic locking processing sequence, the intravehicular/extravehicular communication processing sequence will first be described below.

Basically, the intravehicular/extravehicular communication processing sequence is a mutual authentication communication process that is executed between the vehicle-mounted unit 16 and the portable unit 18 by transmitting request signals from the LF antennas 44, 46, 48, 50 of the vehicle-mounted unit 16 to the LF antenna 108 of the portable unit 18 to activate the portable unit 18.

Consequently, the intravehicular/extravehicular communication processing sequence is essentially similar to the extravehicular communication processing sequence described above with reference to FIG. 7 except for the processing with respect to the intravehicular antennas 44, 46. For an easier understanding of the present invention, therefore, those steps of the intravehicular/extravehicular communication processing sequence which are similar or identical to those of the extravehicular communication processing sequence are denoted by identical step numbers with a suffix "A", and will be described briefly below.

The intravehicular/extravehicular communication processing sequence shown in FIG. 15 is a process for detecting the legitimate portable unit 18, which has been authenticated, possibly in the passenger's compartment shown in FIG. 4, i.e., the range ETI in the passenger's compartment, or in the vicinity of the vehicle 12, i.e., the range ETO around the vehicle 12. Accordingly, standby signals are not outputted from the intravehicular LF antennas 44, 46 in steps S101, S102 in the extravehicular communication processing sequence shown in FIG. 7, but request signals for requesting the transmission of LF signals are transmitted successively from the intravehicular LF antenna 44 in step S101A, the extravehicular LF antenna 48 in step S103A, the intravehicular LF antenna 46 in step S102A, and the extravehicular LF antenna 50 in step S113A.

When the request signals are received by the portable unit 18 in steps S201A, S203A, the vehicle-mounted unit 16 and the portable unit 18 mutually communicate with each other for authentication in step S150A or steps S104A, S106A, S107A representing the same process for transmitting and receiving the identification information as described above in steps S150, S118 in the extravehicular communication processing sequence, and step S108A or steps S105A, S108A for determining whether the stored identification information and the received identification information match each time a request signal is received.

When the identification information stored in the vehicle-mounted unit 16 and the identification information received from the portable unit 18 match (when the identification signals and the calculated cryptographic results match, or also referred to as "when authentication is confirmed"), if authentication is confirmed based on the transmission of request signals from the intravehicular antennas 44, 46 in step S109A, then the in-compartment portable unit flag Fki is set, and if authentication is established based on the transmission of request signals from the extravehicular antennas 48, 50, then the around-vehicle portable unit flag Fko is set. The intravehicular/extravehicular communication processing sequence is carried out as described above.

Prior to describing details of the automatic locking processing sequence in step S5, the lock switch processing sequence in step S4, i.e., the process of automatically locking the doors, which is manually activated by operating the door lock switch 22, will briefly be described below.

In the lock switch processing sequence, when the user of the portable unit 18 manually operates (presses) the door lock switch 22 while all the doors are closed, i.e., all the door switches 28 are turned off, the extravehicular communication processing sequence shown in FIG. 7 is carried out when the user of the portable unit 18 is in the vicinity of the vehicle 12, i.e., in the area ETO around the vehicle 12 except its region that overlaps the range ETI within the passenger's compartment.

If the portable unit 18 is positioned in the vicinity of the vehicle 12 based on the results of the extravehicular communication processing sequence, the CPU 30 energizes the lock motor 32 of the door lock actuator 14 through the door lock unit 90, turning the locking lever 36 to lock the doors.

The automatic locking processing sequence will be described in detail below with reference to FIGS. 9 through 14.

Figure 10:
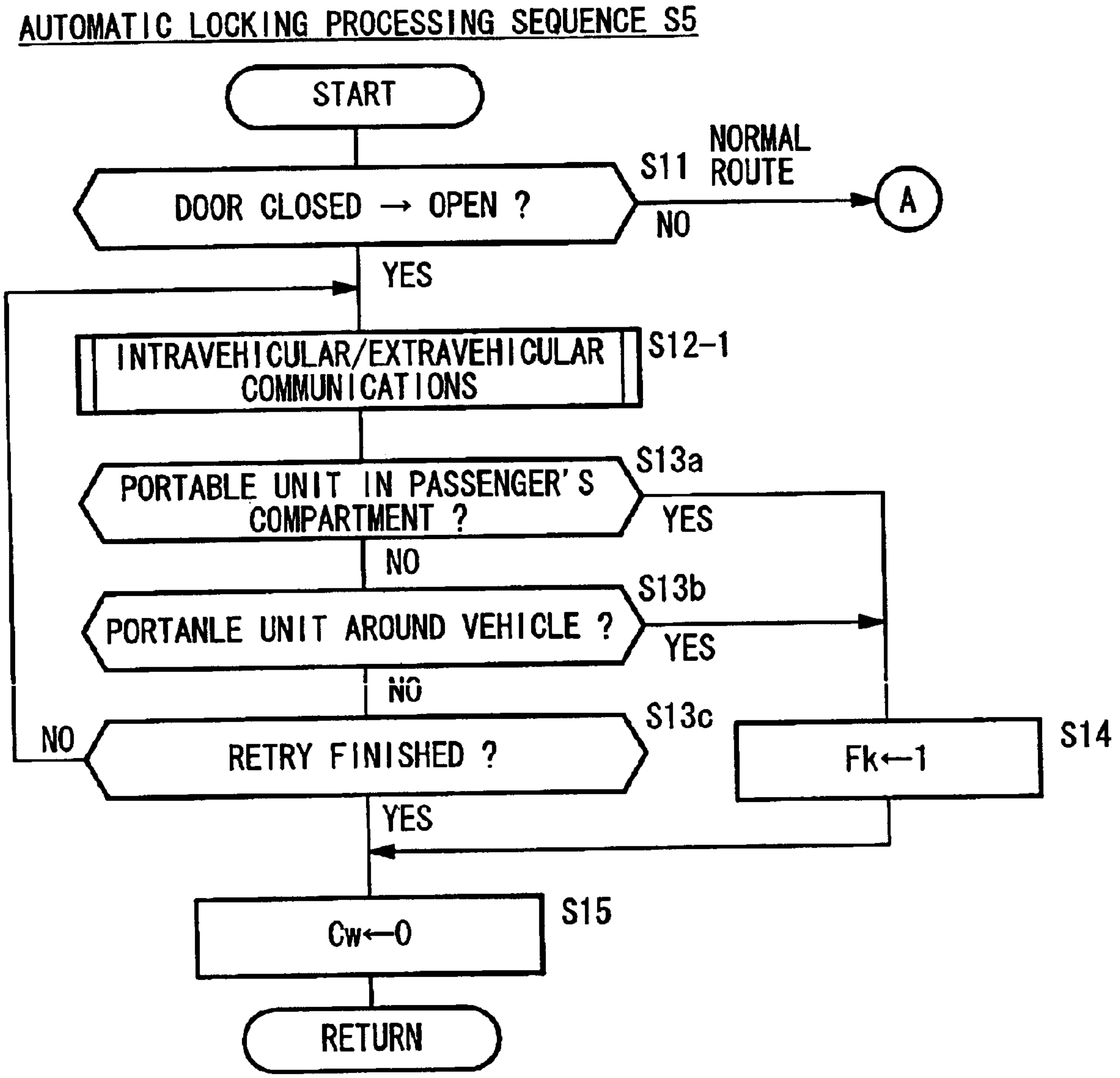
FIGS. 10 through 14 are a detailed flowchart of the automatic locking processing sequence shown in FIG. 9.
Figure 11:
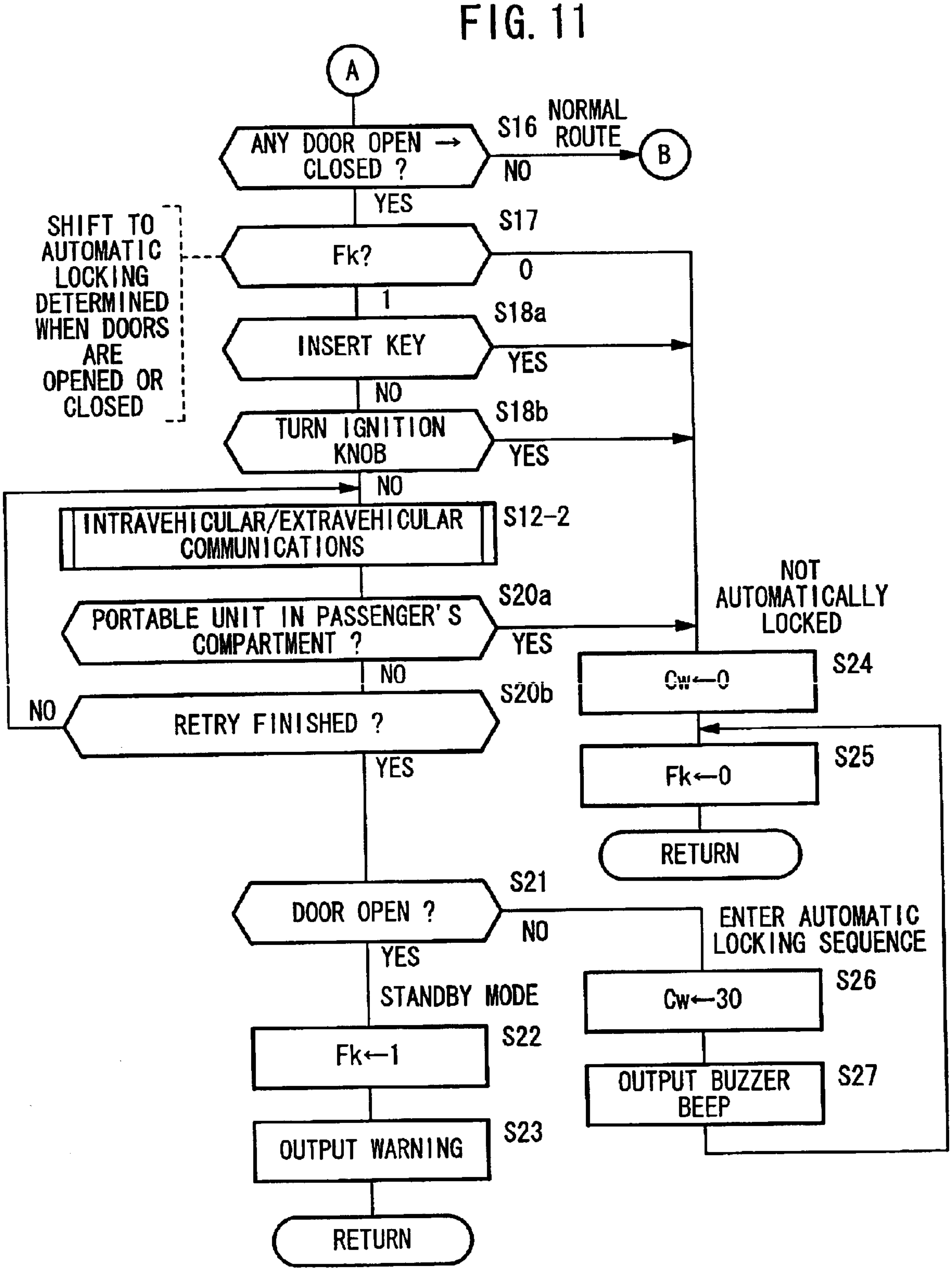
Figure 12:
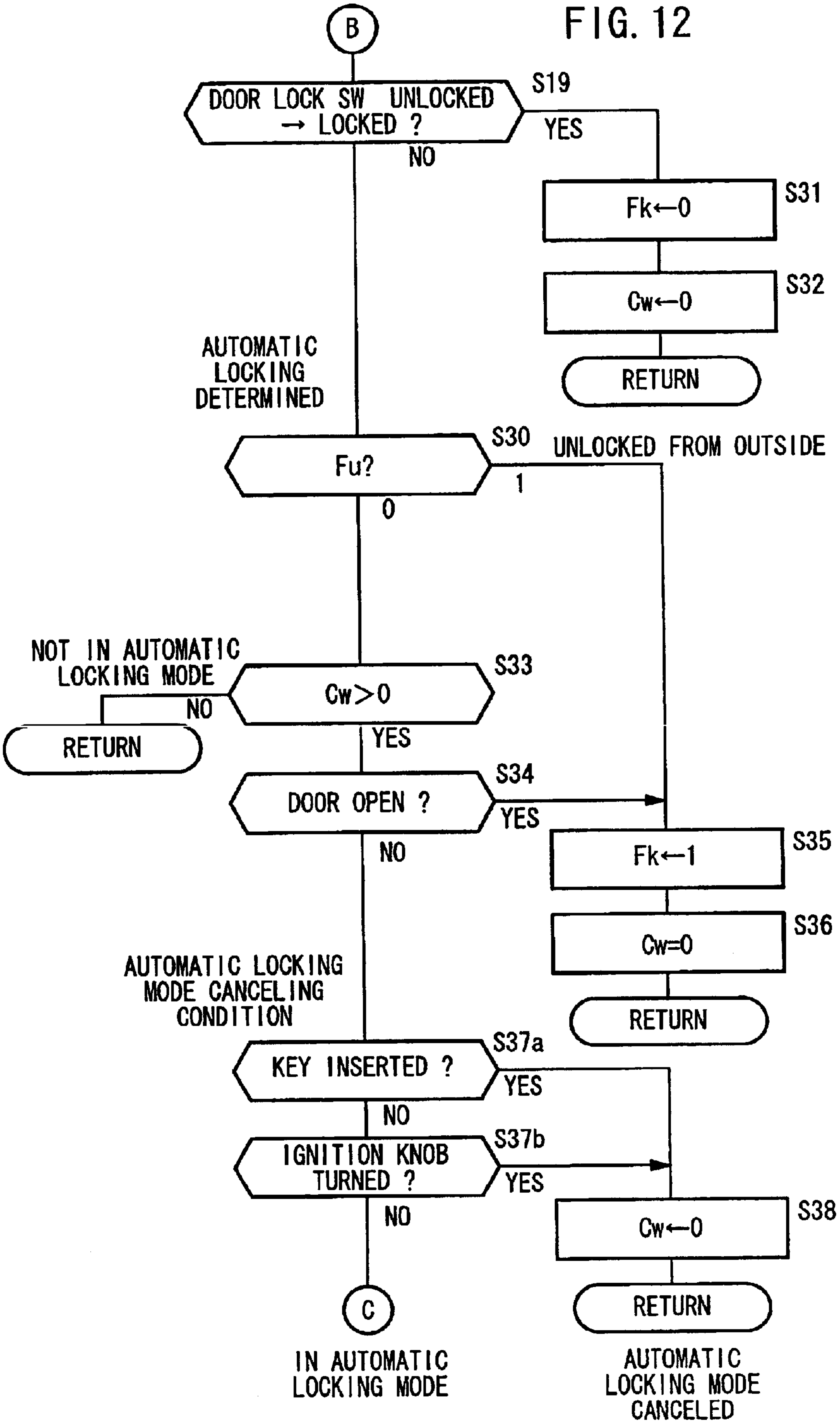

In step S11 shown in FIGS. 9 and 10, it is determined whether one of the doors of the vehicle 12 is opened or not, i.e., the opening of a door is detected (closed door state→open door state). Specifically, on or off states of the four front and rear door switches 28 of the vehicle 12 are read by the CPU 30 through the door lock unit 90 to detect the opening of a door. When all the doors are closed, all the door switches 28 are turned off. When either one of the closed doors is opened, the door switch 28 associated with the door that opened is turned on, and the signal outputted from the door switch 28 is detected to confirm that the door is opened. The answer to step S11 becomes affirmative the instant a door is opened, i.e., the instant the opening of one of the doors which have been judged as being closed in a preceding processing cycle is detected in a present processing cycle.

If the opening of a door is detected, then the intravehicular/extravehicular communication processing sequence is carried out to determine whether the portable unit 18 is within or outside the vehicle 12 as described above with reference to FIG. 15, in step S12-1.

When the intravehicular/extravehicular communication processing sequence is finished in step S12-1, the in-compartment portable unit flag Fki and the around-vehicle portable unit flag Fko are confirmed respectively in steps S13*a,* S13*b* (see FIG. 10). If the portable unit 18 is present in the range ETI within the passenger's compartment or the range ETO around the vehicle 12, i.e., if either the flag Fki or Fko is set, then the portable unit presence confirmation flag Fk (Fk←1) is set in step S14.

The flow from step S11 (YES) to step S14 is required to continue the automatic locking processing sequence for automatically locking the doors based on mutual communications between the vehicle-mounted unit 16 and the portable unit 18, because it is judged that there is a sign indicating that the user with the portable unit 18 will get off the vehicle 12 as one of the doors is opened and the door may be locked if the user does get off. This flow is needed for setting the portable unit presence confirmation flag Fk to finalize that the portable unit 18 is within the passenger's compartment or around the vehicle 12, after the opening of a door is detected in step S11.

After the opening of a door is detected in step S11, the automatic lock counter Cw is cleared (Cw←0) in step S15.

As indicated by step S13, the intravehicular/extravehicular communication processing sequence in step S12-1 is retried twice.

A sign indicating that the user with the portable unit 18 getting off the vehicle 12, as judged in step S11, is not limited to detection of the opening of a door, but may be represented by detection of various states. For example, the sign may be represented by the elimination of an output signal from the key insertion detecting switch 62 due to the removal of the immobilizer key 200 from the knob slot defined in the knob-type ignition assembly, the elimination of an output signal from the knob turn detecting switch 64 due to the returning of the ignition knob to the off position, or the elimination of an output signal of a load sensor provided in a seat at the time the seat belt is unfastened.

In a next cycle after step S15, since the opened door remains open, the answer to step S11 becomes negative, and hence control goes from step S11 to step S16.

In step S16, it is determined whether all the doors are closed from the state in which at least one door is open, based on whether the door switches 28 are turned on or off. If all the door switches 28 are turned off, outputting no signals, it is judged that all the doors are closed.

If it is judged that all the doors are closed, then it is determined in step S17 whether the user of the portable unit 18 is within the passenger's compartment or in the vicinity of the vehicle 12, based on the portable unit presence confirmation flag Fk. If the user of the portable unit 18 is within the passenger's compartment or in the vicinity of the vehicle 12 (Fk=1), then control goes to step S18. If not, then control goes to step S24. The answer to step S16 becomes affirmative the instant all the doors are detected as being closed in the present processing cycle from the state in which one of the doors is open in the preceding processing cycle. If all the doors are closed in the preceding and present processing cycles, then the answer to step S16 becomes negative.

In step S18, it is determined whether various switches in the passenger's compartment are operated or not. Specifically, in the present embodiment, the key insertion detecting switch 62 is checked to confirm if the immobilizer key 200 is inserted into the knob slot in step S18*a* shown in FIG. 11, and the knob turn detecting switch 64 is checked to confirm if the ignition knob is turned in step S18*b* shown in FIG. 11.

If the immobilizer key 200 is detected as being inserted into the knob slot and also if the ignition knob is detected as being turned, it is judged that all the doors are closed, with the user of the portable unit 18 being in the vehicle 12. In this case, since it is not necessary to automatically lock the doors of the vehicle 12, control goes to step S24.

If it is judged that the switches in the passenger's compartment are not operated in step S18, then the automatic locking processing sequence is continued, and control goes to step S12-2.

In step S12-2, request signals are transmitted again to carry out the intravehicular/extravehicular communication processing sequence for thereby confirming the position of the portable unit 18.

If the portable unit 18 is not positioned in the given range in the passenger's compartment, then it is judged that the opening of a door in step S11, and the closing of all the doors in step S16 are due to the action in which the user of the portable unit 18 gets off the vehicle 12, and control goes to step S21.

In step S16, if the user of the portable unit 18 closes the doors of the vehicle 12, some of the doors may be left half-open (or incompletely closed) due to reactive forces from the ratchet of a door lock mechanism or a weather strip. In step S21, therefore, it is confirmed whether any of the doors is left open based on the output signals from the door switches 28.

If an output signal from at least one of the door switches 28 is detected, i.e., if one of the door switches 28 is detected as being turned on, then the portable unit presence confirmation flag Fk is set in step S22, interrupting the automatic locking processing sequence. In step S23, a warning is outputted by beeping the buzzer 82 several times, indicating that the doors are half-opened to the user of the portable unit 18. In step S23, the control unit 80 of the vehicle-mounted unit 16 may produce a warning/attention message such as "DOOR MAY BE HALF-OPEN. CONFIRM DOORS ARE CLOSED" through a speaker (not shown) connected to the control unit 80 according to a speech synthesizing process. The buzzer 82 may be replaced with or may be used in combination with such a speaker. When the warning indicating the half-opening of doors is outputted, control returns to first decision step S11 of the automatic locking processing sequence in the next processing cycle.

If a person notices the warning indicating that at least one of the doors is left half-open and unlocked, and then closes the half-open door, thus closing all the doors (YES in step S16), the following steps are carried out. Since the portable unit presence confirmation flag Fk has been set in step S22, then irrespective of whether the portable unit 18 is in the range ETI in the passenger's compartment or the range ETO around the vehicle 12 when the position of the portable unit 18 is detected upon the opening of a door, the flow from step S17 (YES) through step S18 (NO) and step S12-2 to step S20 (steps S20*a,* S20*b*) is executed to detect that the portable unit 18 is not in the passenger's compartment (NO in step S20). If the doors are reliably closed with no possibility of being half-open (NO in step S21), then the automatic lock counter Cw is set to 30 in step S26, canceling the interruption of the automatic locking processing sequence. Control then goes to a next stage of the automatic locking processing sequence.

If it is judged that no doors are left half-open in step S21, then control goes to step S26. In step S26, control is permitted to go to a next stage of the automatic locking processing sequence. The next stage of the automatic locking processing sequence is a process of intermittently transmitting a request signal. In this process, the automatic lock counter Cw is set to 30 (Cw←30), which is the number of times that a request signal is intermittently transmitted per second. In step S27, the buzzer 80 produces an output indicating to the user of the portable unit 18 that the automatic locking processing sequence is normally proceeding, then control goes to step S25.

In step S25, since control is permitted to go to the next stage of the automatic locking processing sequence, the portable unit presence confirmation flag Fk is cleared.

The process of intermittently transmitting a request signal, which is the next stage of the automatic locking processing sequence, is a process of detecting the position of the portable unit 18, i.e., monitoring the position of the portable unit 18, as required, by intermittently transmitting a request signal in the range ETI in the passenger's compartment and the range ETO around the vehicle 12, and automatically locking the doors of the vehicle 12 if the portable unit 18, i.e., the user of the portable unit 18, is detected as leaving the vehicle 12.

In step S17, the portable unit presence confirmation flag Fk is not set when, for example, a person who is not carrying the portable unit 18 closes or opens a door to get on or off the vehicle 12, while the vehicle 12 is being parked with the unlocked doors.

In this case, because the portable unit 18 is not detected in steps S12-1, S13, the portable unit presence confirmation flag Fk is not set. If a person who is not carrying the portable unit 18 closes all the doors, then control goes from step S16 to step S17.

Since the doors of the vehicle 12 do not need to be automatically closed in such a situation, steps S18, S12-2, S20 are skipped, preventing request signals from being unduly transmitted. Then, the automatic lock counter Cw is cleared in step S24.

If the answer to step S20 is YES, i.e., if the opening of a door is detected in step S11, and thereafter all the doors are detected as being closed in step S16, the portable unit presence confirmation flag Fk is set (Fk=1) in step S17, judging that the portable unit 18 is in the passenger's compartment, then it is judged that the user of the portable unit 18 has gotten in the vehicle 12, and not off. Thus, control is inhibited from going to a next stage of the automatic locking processing sequence. Then, the automatic lock counter Cw is cleared in step S24, and the portable unit presence confirmation flag Fk is cleared in step S25.

In a next processing cycle after control has gone to the next stage of the automatic locking processing sequence (after steps S26, S27, S25), control goes to step S19 to determine whether the doors are locked from the unlocked state by the door lock knobs 24 based on output signals from the door lock knob switches 26. If the doors are locked, then portable unit presence confirmation flag Fk is cleared in step S31, and the automatic lock counter Cw is cleared in step S32, whereupon the automatic locking processing sequence is put to an end.

If at least one door remains open or if all the doors remain closed, then it is determined in step S19 whether the doors are locked from the unlocked state based on output signals from the door lock knob switches 26, determined in step S30 whether the door is unlocked by the door sensor 20, and determined in step S33 whether the value of the automatic lock counter Cw is 1 or more, i.e., whether a flow following step S34 is carried out for monitoring the position of the portable unit 18 after having detected the user of the portable unit 18 getting off the vehicle 12 and automatically locking the doors of the vehicle 12 when the portable unit 18 leaves the vehicle 12.

In step S19, the door lock knob switches 26 may indicate the locking of the doors if the doors are open (the answer to step S11 is affirmative and then negative in a next processing cycle) and all the doors are not closed (the answer to step S16 is negative), and then the door lock knobs 24 are pressed, and the doors are closed from outside of the vehicle 12 and locked (this locking is usually referred to as "keyless locking"). The door lock knob switches 26 may otherwise indicate the locking of the doors, if, after all the doors are closed, the door lock switch 22 is operated or the door key cylinder 34 is locked using the immobilizer key 200, and a known keyless entry transmitter is operated to lock the doors from outside of the vehicle 12 with an unillustrated keyless entry system.

In these cases, even if the closing of all the doors is detected in step S16 on the assumption of the closing of the doors in next and subsequent processing cycles, the automatic locking of the doors is not required, and the automatic locking processing sequence is ended after steps S17, S24.

If the doors are not locked by the door lock knob switches 26, then control goes to step S30. According to the door sensor signal input processing sequence in step S3, which has been described above with reference to FIG. 6, determines whether the doors are unlocked based on the state of the door sensor unlock flag Fu.

The answer to step S30 becomes affirmative when the doors are locked and the user of the portable unit 18 triggers the door sensor 20 on the door on the driver's seat side to unlock the door, or stated otherwise when the legitimate portable unit 18, which has been authenticated, is in the given range around the vehicle at the time the doors are unlocked. If the answer to step S30 is affirmative, then the portable unit presence confirmation flag Fk is set in step S35, and then the automatic lock counter Cw is cleared (Cw←0) in step S36.

Since the portable unit presence confirmation flag Fk is set in step S35 in the above flow, when, for example, the user of the portable unit 18 realizes he or she has left something behind in the vehicle 12, returns to the parked vehicle 12, opens the door on the assistant's seat side, or the door therebehind outside the given range around the vehicle 12, picks up whatever he or she left behind, and then closes the door, even if the portable unit 18 is detected as being not in the range in the passenger's compartment or the range around the vehicle 12 upon the opening of a door (YES in step S11), the flow from step S17 (YES) through step S18 (NO) and step S12-2 to step S20 is executed to detect that the portable unit 18 is not in the passenger's compartment (NO in step S20) if all the doors are closed (YES in step S16). If the doors are reliably closed with no possibility of being half-open (NO in step S21), then the automatic lock counter Cw is set to 30 in step S26, allowing control to go to the mode for intermittently transmitting request signals in the automatic locking processing sequence. Therefore, the doors are prevented from being unlocked.

If the door sensor unlock flag Fu is not set, then it is determined whether or not the value of the automatic lock counter Cw is 1 or more (Cw>0). If the value of the automatic lock counter Cw is 0 (Cw=0), then the automatic locking processing sequence is put to an end.

If the automatic lock counter Cw is set to 30 in step S26, then since the value of the automatic lock counter Cw is 1 or more, the answer to step S33 becomes affirmative, and the flow from step S34 is executed.

In step S34, it is determined whether the doors are open or not. If the doors are not open, then control goes to step S37.

In step S37, it is determined whether various switches in the passenger's compartment are operated or not. Specifically, in the present embodiment, the key insertion detecting switch 62 is checked to confirm if the immobilizer key 200 is inserted into the knob slot in step S37*a* shown in FIG. 12, and the knob turn detecting switch 64 is checked to confirm if the ignition knob is turned in step S37*b* shown in FIG. 12.

If the answer to step S37 is affirmative, then since the user of the portable unit 18 is assumed to be in the vehicle 12, it is judged that the doors do not need to be automatically locked. The automatic lock counter Cw is cleared, and the automatic locking processing sequence is put to an end. At this time, because the portable unit presence confirmation flag Fk is cleared, it remains to be Fk=0.

If no switch operation is detected in step S37, the value of the automatic lock counter Cw is decremented by 1 (Cw←Cw−1) each time a predetermined period of time, i.e., 1 second in the present embodiment, elapses in step S39.

Figure 13:
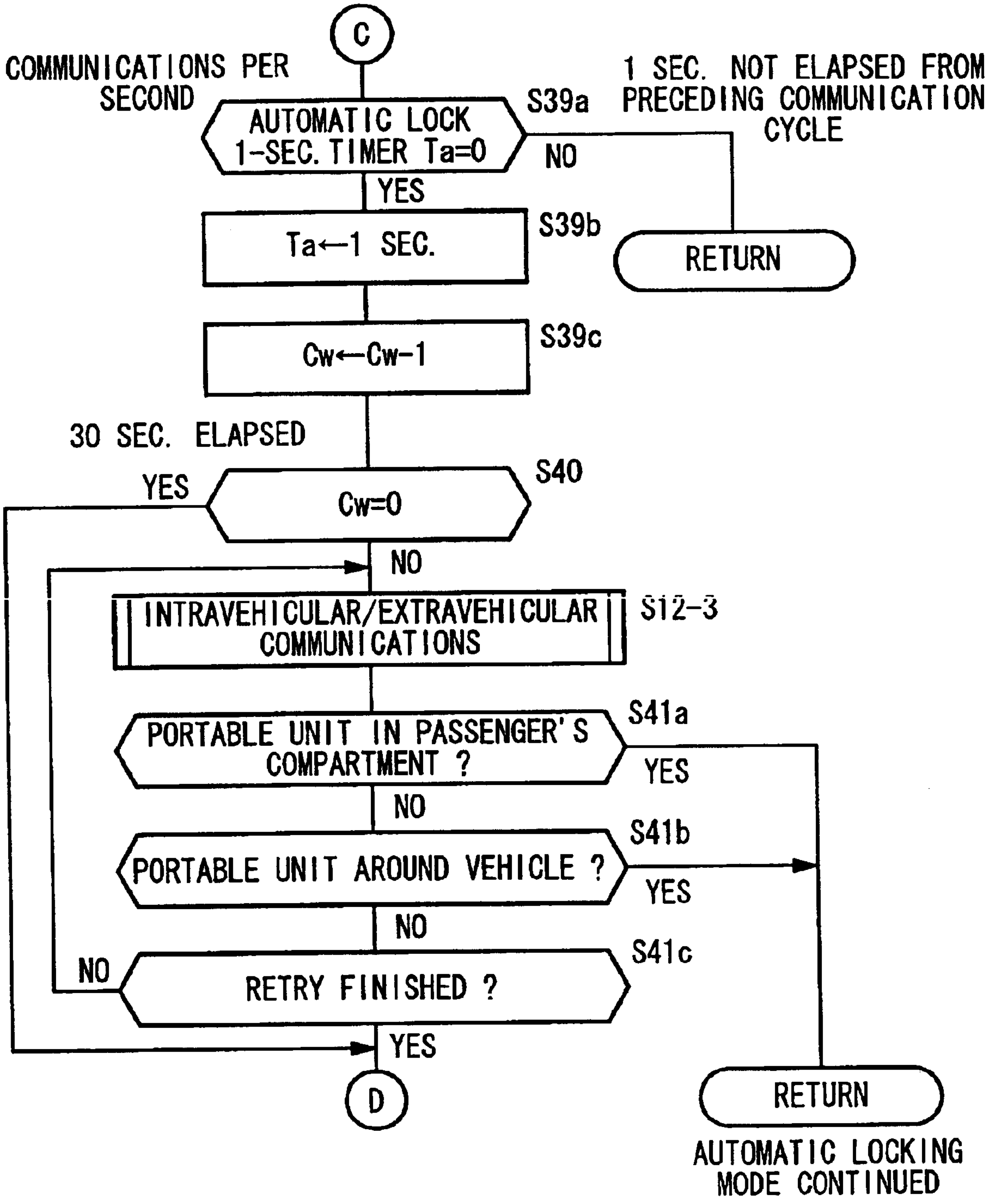

More specifically, as shown in FIG. 13, it is confirmed in step S39*a* whether the value of an automatic lock 1-second timer Ta is Ta=0 [second] or not. If it is not 0, then since one second had not elapsed after previous communications based on the transmission of request signals, the automatic locking processing sequence enters a next processing cycle. If one second has elapsed (Ta=0 [second]), then the automatic lock 1-second timer Ta is set to 1 [second] in order to start measuring a next one second.

Immediately after the automatic lock 1-second timer Ta is set to 1 [second], it starts counting down from 1 second to 0 second.

As the automatic lock 1-second timer Ta has measured one second in step S39*a*, the value of the automatic lock 1-second timer Ta is decremented by 1 in step S39*c*.

In step S40, it is determined whether the automatic lock counter Cw has counted 30 or not. If the automatic lock counter Cw has not counted 30, then a request signal is intermittently transmitted per second in steps S12-3, S41 (S41*a*, S41*b*, S41*c*), i.e., the portable unit 18 is detected in the passenger's compartment or around the vehicle 12 to confirm the position thereof in the above intravehicular/extravehicular communication processing sequence. If the portable unit 18 is detected in the range ETI in the passenger's compartment or the range ETO around the vehicle 12, then the automatic locking processing sequence is continued in a next processing cycle.

If the value of the automatic lock counter Cw reaches 0 in step S40 in the next processing cycle, i.e., if 30 seconds have elapsed as the request signal is intermittently transmitted 29 times after all the doors have been closed, then control goes to step S42 in which the automatic lock counter Cw is cleared. Then, the locking of half-opened doors is confirmed in step S43 immediately before a signal is outputted to automatically lock all the doors.

If the value of the automatic lock counter Cw is not 0, but a value of 1 or greater (if the counting of 30 is not finished), or stated otherwise, if the portable unit 18 is not detected in a request signal retrying process in step S41*c*, or specifically if the user of the portable unit 18 walks out of the range ETO around the vehicle 12 and the portable unit 18 cannot be detected in the range ETO around the vehicle 12 within 30 counts (30 seconds) after the user of the portable unit 18 has closed all the doors, then it is judged that the user of the portable unit 18 has left the vehicle 12. Control then goes to step S42 for automatically locking the doors in order to prevent an oversight to lock the doors. The automatic lock counter Cw is cleared. Then, the locking of half-opened doors is confirmed in step S43 immediately before all the doors are automatically locked, and in step S50 immediately after all the doors are automatically locked.

If the answer to step S34 becomes affirmative while the automatic lock counter Cw is counting, i.e., the request is being intermittently transmitted, then the portable unit presence confirmation flag Fk is set in step S35 and the automatic lock counter Cw is cleared in step S36 in order to interrupt (stop) the intermittent transmission of the request signal.

When the user of the portable unit 18 or a person other than the user of the portable unit 18 opens the door on the assistant's seat side or the door therebehind in order to handle luggage or pick up something left in the vehicle 12 after all the doors have been closed, the opening of the door is detected in step S11, and the portable unit 18 is not detected in range ETI in the passenger's compartment or the range ETO around the vehicle 12 in steps S12-1, S13. After luggage is handled or something left in the vehicle 12 is picked up, the door is closed again, thus, with all the doors closed, and the answer to step S16 becomes affirmative. At this time, even if the portable unit 18 is not detected in range ETI in the passenger's compartment or the range ETO around the vehicle 12 upon the detection of the opening of the door, since the portable unit presence confirmation flag Fk is set in step S35, the flow from step S17 through steps S18, S12-2 to step S20 is carried out to detect the portable unit 18 as not being in the passenger's compartment. If there is no possibility of doors being half-open (NO in steps S20, S21), the automatic lock counter Cw is set to 30 in step S26, resuming the intermittent transmission of a request signal.

If the answer to step S37 becomes negative, then it is determined whether the door switches 28 are outputting signals in steps S43, S50, determining any possibility of doors being half-open.

The reasons for determining any possibility of doors being half-open in steps S43, S50 will be described below with a counter example describing what will happen if steps S43, S50 do not exist. In the counter example, after step S42, step S43 is skipped, and all the doors are locked in step S47, i.e., an all door locking signal is outputted to the door lock unit 90 in step S47 to operate the door lock actuator 14 to lock all the doors.

Specifically, when the processing of step S42 is finished, or stated otherwise, simultaneously a locking signal is outputted immediately after the user of the portable unit 18 walks out of the range ETO around the vehicle 12 before 30 seconds elapse after all the doors are closed, or simultaneously a locking signal is outputted upon elapse 30 seconds, the user of the portable unit 18 opens the rear seat door on the boundary of the range ETO around the vehicle 12 in order to pick up something left in the vehicle 12. In step S47, since it takes about 700 [ms] after the lock signal is outputted from the control unit 80 until the door lock unit 90 operates the door lock actuator 14 to actually lock the doors, the doors are locked while they are half-open.

The process of detecting doors being half-open in step S43 is inserted in order to prevent the doors from being locked while they are half-open. Specifically, before the all door locking signal is outputted in step S47, the state of the door switches 28 is detected in step S43. If any of the door switches 28 is turned on, then it is judged that there is a possibility of doors being half-open, and a process of preventing the doors from being locked while they are half-open, i.e., a half-open door locking prevention process, is carried out in step S44.

Figure 14:
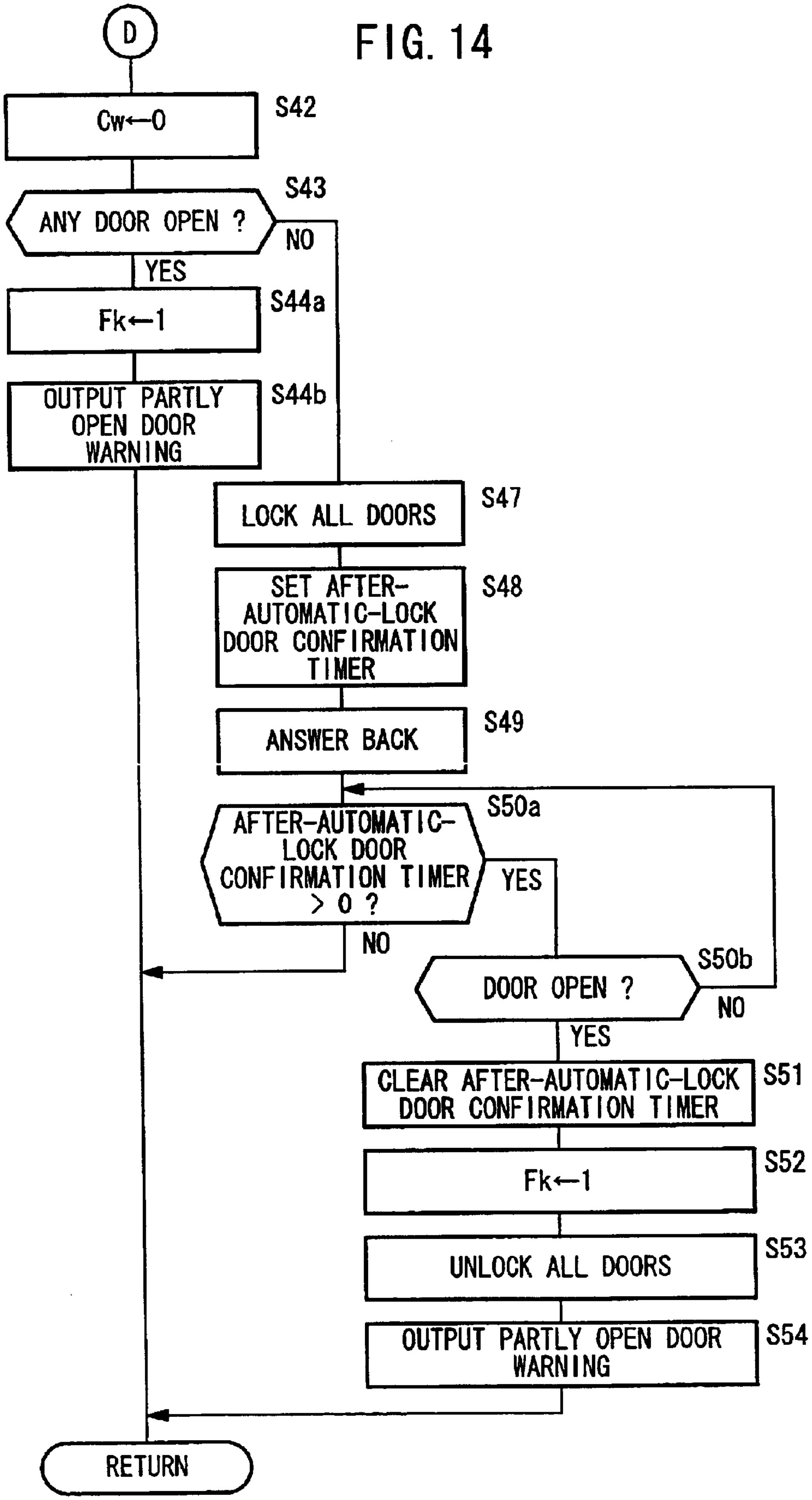

In the half-open door locking prevention process, the portable unit presence confirmation flag Fk is set in step S44*a* in FIG. 14, and a warning is issued from the buzzer 82 in step S44*b*. At this time, the all door locking signal is not outputted, and hence, the doors are not automatically locked.

If it is judged that there is a possibility of doors being half-open in step S43, then since the portable unit presence confirmation flag Fk is set in step S44*a* and a warning is issued from the buzzer 82 in step S44*b,* a person (the portable unit user or the portable unit non-user) who has noticed that the doors are open and unlocked closes the doors. When all the doors are closed, the flow from step S17 through steps S18, S12-2 to step S20 is carried out irrespective of whether the portable unit 18 is in the range ETI in the passenger's compartment or the range ETO around the vehicle 12 when the position of the portable unit 18 is detected upon the opening of a door. The portable unit 18 is detected as not being in the passenger's compartment (NO in step S20). If the doors are reliably closed with no possibility of being half-open (NO in step S21), then the automatic lock counter Cw is set to 30 in step S26, resuming the intermittent transmission of a request signal.

Step S48 for setting an after-automatic-lock door confirmation timer and step S50 after answer back in step S49 are also steps for detecting doors being half-open.

In step S48, the after-automatic-lock door confirmation timer is set to a time of about one second, which is equal to the sum of 700 ms and a marginal time, after the doors are automatically locked.

After the locking signal is outputted in step S47, an answer back process is carried out in step S49 to indicate that the doors are automatically locked and the automatic locking processing sequence is put to an end.

Thereafter, a possibility of doors being half-open is detected again in step S50. In step S50, as shown in FIG. 14, while the after-automatic-lock door confirmation timer is counting in step S50*a,* the state of the door switches 28 is detected in step S50*b*. If any of the door switches 28 outputs a signal indicating that the door is open (the door switch 28 is turned on), then control goes to the half-open door locking prevention process in step S51 and subsequent steps.

If the turn-on of the door switch 28 is detected in step S50, the door is regarded as being locked while being half-open. The after-automatic-lock door confirmation timer is cleared in step S51. The portable unit presence confirmation flag Fk is set in step S52. In step S53, the control unit 80 outputs an unlocking signal to operate the door lock actuator 14 to unlock all the doors. Thereafter, a warning is outputted to indicate that the doors are unlocked while being open in step S54.

Since the portable unit presence confirmation flag Fk has been set, when the doors are closed, and the intermittent transmission of a request signal is resumed, as with the half-open door locking prevention process in step S44.

If the open state of any door is not detected and the counting of the after-automatic-lock door confirmation timer is finished (NO in step S50*a*), then it is judged that the doors are normally automatically locked, and the automatic locking processing sequence is put to an end.

In the present embodiment, the identification information is representative of both the identification signal and the cryptographic code. However, the identification information may be representative of either one of the identification signal and the cryptographic code.

According to the above embodiment, various advantages as described below can be achieved.

(1) After the user of the portable unit 18 gets off the vehicle 12, all the doors are closed once. While request signals are being transmitted from the LF antennas 44, 46, 48, 50 as a vehicle-side request signal transmitting means when the doors are automatically locked, a memory means (steps S34, S35) stores a state representing that at least one of the doors has changed from a closed state to an open state. Also based on the stored information in the memory means, the doors can automatically and reliably be locked if all the doors are closed after the user of the portable unit 18 gets off the vehicle 12. For example, when the user of the portable unit 18 gets off the vehicle 12 and then all the doors are closed regardless of the time required to open the rear seat door and handle luggage in the vehicle 12, the doors are automatically locked. Therefore, the automatic door locking function has better reliability, and doors are prevented from being unlocked thus increasing security of the vehicle.

A transmission stopping means (steps S34→(S35)→S36) is provided for stopping the transmission of request signals from the vehicle 12 when at least one of the doors has changed from a closed state to an open state during a period in which request signals are transmitted from the LF antennas 44, 46, 48, 50. The transmission stopping means stops the transmission of request signals while the doors are open and the user of the portable unit 18 does not intend to lock the doors. Consequently, any unwanted transmission of request signals is prevented, thus preventing the vehicle 12 and the portable unit 18 from consuming excessive electric energy.

(2) In a remote automatic door locking apparatus for automatically locking the doors of the vehicle 12 when the user of the portable unit 18 leaves the vehicle 12 and walks out of the range ETO around the vehicle 12, doors are prevented from being locked while being half-open possibly when the doors are opened simultaneously at the same time that (immediately before or after) the automatic locking signal is outputted (step S47).

To carry out the above operation, a half-open door locking prevention means (steps S43, S50) is provided for determining a possibility of locking doors while they are not fully closed in the automatic locking processing sequence after the user of the portable unit 18 gets off the vehicle 12, i.e., a possibility of locking doors while being half-open. If the half-open door locking prevention means detects the opening of a door immediately before or after a locking signal is outputted and judges that there is a possibility of the door being half-open, then a door locking means (steps S44, S53) unlocks the doors. Therefore, the doors are prevented from being locked while being half-open in the automatic door locking process.

If the half-open door locking prevention means (S43, S50) determines whether a door is open or closed immediately before a locking signal is outputted (step S43), or immediately after a locking signal is outputted (step S50) after a condition for outputting the locking signal (step S47) is satisfied, and detects a possibility that the door is opened immediately before the locking signal is outputted, then it inhibits the locking signal from being outputted, and issues a warning representing that the door remains open (step S44). If the half-open door locking prevention means detects a possibility that the door is opened immediately after the locking signal is outputted, then it outputs an unlocking signal (step S53) and issues a similar warning (step S54). The portable unit user or portable unit non-user thereafter closes the door, which is locked to prevent theft in or of the vehicle 12.

(3) When the user of the portable unit 18 gets off the vehicle 12, then closes the doors, and walks away from the vehicle 12, and the automatic locking processing sequence is carried out, if a door is half-open because the user of the portable unit 18 has applied only a small force to close the door, then the automatic locking processing sequence is interrupted. When the door is fully closed, the automatic locking processing sequence is resumed.

Specifically, when a portable unit position upon door opening detecting means (a portable unit position upon indication of getting off detecting means or a second position detecting means, step S13) detects the presence of the portable unit 18 in the passenger's compartment or around the vehicle 12, then if an open door state detecting means (28, step S21) detects the open state of a door after a portable unit position upon getting off detecting means (a fourth position detecting means, step S20) has detected that the portable unit 18 is not present in the passenger's compartment, i.e., if an open door state detecting means detects a door being half-open, a standby means (step S22) interrupts the transmission of a signal from a portable-unit-presence-detection vehicle-side transmitting means (step S12-3) and brings it into a transmission standby state (the automatic lock counter Cw is not set), thereby interrupting the automatic locking processing sequence. The door is thus prevented from being locked while being half-open. As a result, the vehicle 12 is better protected against theft, and its commercial value is increased.

If an all door closing detecting means (a getting-off detecting means) (step S16) detects that the open state of at least one door changes to the closed state of all the doors in the transmission standby state, the interruption of a signal from the portable-unit-presence-detection vehicle-side transmitting means (step S12-3) is canceled (step S26, the automatic lock counter Cw is set to 30), starting to transmit request signals.

Thus, when a passenger (the portable unit user or the portable unit non-user) notices that a door is half-open and closes the door, the automatic locking processing sequence is resumed. Then, when the passenger (the portable unit user) leaves the vehicle 12, the doors are automatically locked.

When the automatic locking processing sequence is resumed after a door being half-open is detected, an indicating means (82, step S27) is operated to confirm the restart of the automatic locking processing sequence.

When a half-opened door is detected, an indicating means (82, step S54) is operated. Therefore, it can be confirmed whether a door is half-open based on whether the indicating means (82, step S54) is operated or not. Accordingly, a door is reliably prevented from being left half-open, and preventing thief of or in the vehicle 12.

If the portable unit position upon door opening detecting means (the second position detecting means, step S13) detects the non-presence of the portable unit 18 in the passenger's compartment or around the vehicle 12, then the vehicle-side transmitting means does not transmit request signals (step S16, NO in step S17) based on an output signal from the all door closing detecting means (step S16). Thus, unnecessary transmission of request signals due to the opening or closing of a door by a person other than the portable unit user is prevented, thus preventing the vehicle 12 and the portable unit 18 from wasting electric power.

(4) When the door sensor 20 as an operation detecting means is operated to unlock the door, i.e., when the door is opened, a memory means (step S35) stores information indicating that the portable unit is present in the range outside of the vehicle 12. If the memory means stores information indicating that the door is unlocked, then the door is automatically locked based on the stored information.

Consequently, when all the doors are closed and locked, and the user of the portable unit 18 realizes he or she left something in the vehicle 12, returns to the parked vehicle 12, touches the door sensor 20 on the door on the driver's seat side to unlock the door, thereafter opens the door on the assistant's seat side or the door therebehind outside the effective transmission range (given range) around the vehicle 12, picks up whatever he or she left in the vehicle 12, and then closes the door, if all the doors are closed, the automatic locking processing sequence is carried out to reliably lock the doors if the memory means stores information indicating that the doors are unlocked upon the operation detecting means, irrespective of whether the portable unit 18 is in the range in the passenger's compartment or the range around the vehicle 12 when the position of the portable unit 18 is detected upon the opening of the door. Thus, an oversight of locking the doors is prevented. Therefore, the automatic door locking function has better reliability, and an oversight of locking the doors is prevented thus increasing security.

In response to an output signal from the all door closing detecting means (step S16) which detects that the open state of at least one door to the closed state of all the doors, a portable unit position upon all door closing detecting means (a portable unit position upon closing of all doors detecting means or a fourth position detecting means, step S12-2) detects the position of the portable unit 18. When the portable unit position upon closing of all doors detecting means detects the non-presence of the portable unit 18 in the vehicle 12, the vehicle-side request signal transmitting means transmits transmission request signals in the ranges within the passenger's compartment and around the vehicle 12. Therefore, while the doors are open, or when the portable unit 18 is in the passenger's compartment, no request signals are transmitted. When the doors are open and do not need to be locked, or the user of the portable unit 18 is in the vehicle and the doors do not need to be automatically locked, the unnecessary transmission of request signals is prevented, thus preventing the vehicle 12 and the portable unit 18 from wastefully consuming electric energy.

According to the present invention, as described above, the doors are automatically and reliably locked even when the portable unit user operates an activating member to unlock the doors, and then walks away from the vehicle, and a passenger of the vehicle opens and closes the doors.

Although a certain preferred embodiment of the present invention has been shown and described in detail, it should be understood that various changes and modifications may be made therein without departing from the scope of the appended claims.

What is claimed is:

1. An apparatus for automatically locking and unlocking doors of a vehicle, comprising:

operation detecting means mounted on the vehicle at a position operable from outside of the vehicle, for detecting that the operation detecting means is operated, and outputting a signal indicating that the operation detecting means is operated;

door opening detecting means for detecting that at least one of the doors of the vehicle changes from a closed state to an open state, and outputting a signal indicating that the door changes from the closed state to the open state;

vehicle-side transmitting means for transmitting a transmission request signal in a predetermined range in the passenger's compartment of the vehicle and a predetermined range around the vehicle in response to the output signals from said operation detecting means and said door opening detecting means;

a portable unit for transmitting identification information upon reception of said transmission request signal;

vehicle-side receiving means for receiving the identification information transmitted from said portable unit;

first position detecting means for determining whether the identification information received by said vehicle-side receiving means matches identification information stored by said vehicle or not in response to the output signal from said operation detecting means, and detecting the position of said portable unit based on the determined result;

unlocking control means for unlocking the doors of the vehicle when said first position detecting means detects that the portable unit is present outside of the vehicle;

second position detecting means for determining whether the identification information received by said vehicle-side receiving means matches the identification information stored by said vehicle or not in response to the output signal from said door opening detecting means, and detecting the position of said portable unit based on the determined result;

portable-unit-presence-detection vehicle-side transmitting means for transmitting said transmission request signal in said predetermined ranges in said passenger's compartment and around said vehicle, if said second position detecting means detects the position of said portable unit in said predetermined ranges in said passenger's compartment and around said vehicle;

third position detecting means for determining whether the identification information received by said vehicle-side receiving means matches the identification information stored by said vehicle or not, and detecting the position of said portable unit based on the determined result during a period in which said portable-unit-presence-detection vehicle-side transmitting means is intermittently transmitting said transmission request signal;

lock controlling means for locking the doors of the vehicle when said third position detecting means detects that the portable unit is not present at least outside of the vehicle; and memory means for storing information indicating that said unlocking control means unlocked the doors of the vehicle;

said portable-unit-presence-detection vehicle-side transmitting means comprising means for transmitting said transmission request signal in said predetermined ranges in said passenger's compartment and around said vehicle even when said second position detecting means detects that the portable unit is not present in said predetermined ranges, if said memory means stores the information indicating that said unlocking control means unlocks the doors of the vehicle.

2. An apparatus according to claim 1, further comprising:

all door closing detecting means for detecting that at least one of doors of the vehicle changes from an open state to a closed state and all the doors are closed, and outputting a signal indicating that the door changes from the open state to the all door closed state; and fourth position detecting means for determining whether the identification information received by said vehicle-side receiving means matches the identification information stored by said vehicle or not in response to the output signal from said all door closing detecting means, and detecting the position of said portable unit based on the determined result;

said portable-unit-presence-detection vehicle-side transmitting means comprising means for transmitting said transmission request signal in said predetermined ranges in said passenger's compartment and around said vehicle when said fourth position detecting means detects that the portable unit is not present in said predetermined ranges, if said second position detecting means detects that the portable unit is present in said passenger's compartment and around said vehicle or if said memory means stores the information indicating that said unlocking control means unlocks the doors of the vehicle.

* * * * *